United States Patent
He et al.

(10) Patent No.: US 11,144,465 B2
(45) Date of Patent: Oct. 12, 2021

(54) DATA ACCESS METHOD AND APPARATUS

(71) Applicant: Huawei Technologies Co., Ltd., Shenzhen (CN)

(72) Inventors: Jian He, Shenzhen (CN); Xiaoke Ni, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/598,755

(22) Filed: Oct. 10, 2019

(65) Prior Publication Data
US 2020/0050551 A1   Feb. 13, 2020

Related U.S. Application Data

(63) Continuation of application No. PCT/CN2017/080639, filed on Apr. 14, 2017.

(51) Int. Cl.
*G06F 13/16* (2006.01)
*G06F 12/0875* (2016.01)

(52) U.S. Cl.
CPC ...... *G06F 12/0875* (2013.01); *G06F 13/1668* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 8,984,221 | B2* | 3/2015 | Satoyama | G06F 3/0631 711/114 |
| 9,571,125 | B2* | 2/2017 | Lee | H03M 13/373 |
| 9,588,898 | B1 | 3/2017 | Vinson et al. | |
| 2008/0010647 | A1 | 1/2008 | Chapel et al. | |

(Continued)

FOREIGN PATENT DOCUMENTS

| CN | 101075930 A | 11/2007 |
|---|---|---|
| CN | 101079798 A | 11/2007 |

(Continued)

OTHER PUBLICATIONS

Foreign Communication From a Counterpart Application, PCT Application No. PCT/CN2017/080639, English Translation of International Search Report dated Dec. 22, 2017, 2 pages.

(Continued)

*Primary Examiner* — Elias Mamo
(74) *Attorney, Agent, or Firm* — Conley Rose, P.C.

(57) ABSTRACT

In a data access method, after an interface card receives a first data write instruction or a first data read instruction, the interface card generates a second data write instruction or a second data read instruction, and writes the second data write instruction or the second data read instruction into a cache. No resource of a processor of a storage device is used. After the interface card writes the second data write instruction or the second data read instruction into the cache, a cache control unit sends the second data write instruction or the second data read instruction to a storage subsystem. No resource of the processor of the storage device is used. Alternatively, the cache control unit may instruct the storage subsystem to execute the second data write instruction or the second data read instruction.

20 Claims, 10 Drawing Sheets

(56) References Cited

U.S. PATENT DOCUMENTS

| | | | |
|---|---|---|---|
| 2010/0250836 A1* | 9/2010 | Sokolov | G06F 13/28 |
| | | | 711/103 |
| 2011/0032912 A1 | 2/2011 | Cordeiro et al. | |
| 2013/0290647 A1* | 10/2013 | Maeda | G06F 12/0866 |
| | | | 711/149 |
| 2015/0032841 A1* | 1/2015 | Vasudevan | G06F 3/0646 |
| | | | 709/216 |
| 2015/0134871 A1* | 5/2015 | Benisty | G06F 13/1673 |
| | | | 710/308 |
| 2016/0117122 A1 | 4/2016 | Miwa et al. | |
| 2019/0272124 A1 | 9/2019 | Vasudevan et al. | |

FOREIGN PATENT DOCUMENTS

| | | |
|---|---|---|
| CN | 102017717 A | 4/2011 |
| CN | 103377162 A | 10/2013 |
| CN | 104348902 A | 2/2015 |
| CN | 104965798 A | 10/2015 |
| EP | 0564699 A1 | 10/1993 |

OTHER PUBLICATIONS

Foreign Communication From a Counterpart Application, PCT Application No. PCT/CN2017/080639, English Translation of Written Opinion dated Dec. 22, 2017, 5 pages.

Foreign Communication From a Counterpart Application, European Application No. 17905787.2, Extended European Search Report dated Mar. 12, 2020, 5 pages.

\* cited by examiner

DATA ACCESS METHOD AND APPARATUS

CROSS-REFERENCE TO RELATED APPLICATIONS

This application is a continuation of International Patent Application No. PCT/CN2017/080639, filed on Apr. 14, 2017, the disclosure of which is hereby incorporated by reference in its entirety.

TECHNICAL FIELD

The present disclosure relates to the data access field, and in particular, to a data access method and an apparatus.

BACKGROUND

In a storage system, a host needs to frequently perform data access to a storage subsystem of a storage device. In other approaches, a data access manner of a host is as follows. After a processor of a storage device receives a data processing request that is sent by the host and that is for accessing a storage subsystem of the storage device, the processor of the storage device initiates, to the storage subsystem, the data processing request for accessing the storage subsystem. After receiving the data processing request, the storage subsystem performs data processing, and then returns completion information to the processor of the storage device. The processor of the storage device feeds back the completion information to the host.

When the host needs to frequently perform data access to the storage subsystem of the storage device, a processing resource of the processor of the storage device is consumed, a processing rate for processing another event by the processor of the storage device is affected, and a rate for accessing the storage subsystem of the storage device by the host is reduced.

SUMMARY

This application discloses a data access method and an apparatus, in order to resolve a problem that processing resources of a processor in a storage device are strained.

According to a first aspect, a data access method is provided. The method is applied to a storage device, and the storage device includes a cache control unit, an interface card, a cache, and a storage subsystem. The method is for accessing the storage device in a data write access manner. In the method, the interface card receives a first data write instruction sent by a host, and the interface card obtains data and a destination address of the data. The destination address is used to indicate an address at which the data is to be written into the storage subsystem. The interface card writes the data and the destination address into the cache. The interface card generates a second data write instruction, and writes the second data write instruction into the cache. The second data write instruction includes a source address and the destination address, and the source address is an address at which the data is stored in the cache. The cache control unit sends the second data write instruction in the cache to the storage subsystem. After obtaining the second data write instruction, the storage subsystem reads the data from the cache according to the source address, and writes the data into storage space corresponding to the destination address.

In the method for accessing the storage device in the data write access manner, after the interface card receives the first data write instruction, the interface card generates the second data write instruction, and writes the second data write instruction into the cache. No resource of a processor of the storage device is used. The cache control unit sends the second data write instruction to the storage subsystem to instruct the storage subsystem to execute the second data write instruction. When the host needs to frequently perform data access to the storage subsystem of the storage device, according to the method provided in the present disclosure, no processing resource of the processor of the storage device is consumed, a processing rate for processing another event by the processor of the storage device is improved, and a rate for accessing the storage subsystem of the storage device by the host is improved.

Based on the first aspect, in a first implementation, the interface card includes a microprocessor, the cache is in the interface card and is connected to the microprocessor, and the cache control unit is in the interface card. The cache is in the interface card, and the cache of the interface card stores the data, the destination address of the data, and the second data write instruction, in order to save a system memory resource of the storage device.

Based on the first aspect, in a second implementation, the interface card includes a microprocessor, the cache is in the microprocessor, and the cache control unit is in the interface card. The cache is in the interface card, and the cache of the interface card stores the data, the destination address of the data, and the second data write instruction, in order to save a system memory resource of the storage device.

Based on the first aspect, in a third implementation, the storage device further includes a processor, the cache is connected to the processor, and the cache is outside the interface card.

Based on the third implementation of the first aspect, in a fourth implementation, before the interface card obtains the data and the destination address of the data, the method further includes sending, by the processor, the destination address to the host.

Based on any one of the first aspect, or the first to the fourth implementations of the first aspect, in a fifth implementation, after the interface card generates the second data write instruction, and before the cache control unit sends the second data write instruction to the storage subsystem, the method further includes sending, by the interface card, a third data write instruction to the storage subsystem. The third data write instruction is used to instruct the storage subsystem to obtain the second data write instruction from the cache in a direct memory access manner. In this implementation, the second data write instruction is sent to the storage subsystem in the direct memory access manner, in order to improve efficiency of accessing the storage subsystem in the storage device. The third data write instruction is sent by the interface card to the storage subsystem, and no resource of the processor of the storage device is used. When the host needs to frequently perform data access to the storage subsystem of the storage device, the interface card sends the third data write instruction in the present disclosure, such that no processing resource of the processor of the storage device is consumed, the processing rate for processing another event by the processor of the storage device is improved, and the rate for accessing the storage subsystem of the storage device by the host is improved.

Based on any one of the first aspect, or the first to the fifth implementations of the first aspect, in a sixth implementation, the cache includes at least one submission queue, and that the interface card writes the second data write instruction into the cache includes: writing the second data write instruction into the submission queue.

Based on any one of the first aspect, or the first to the sixth implementations of the first aspect, in a seventh implementation, that the interface card obtains data and a destination address of the data includes: obtaining, by the interface card, the data and the destination address of the data from the first data write instruction.

Based on any one of the first aspect, or the first to the sixth implementations of the first aspect, in an eighth implementation, that the interface card obtains data and a destination address of the data includes: receiving, by the interface card in a remote direct memory manner, the data and the destination address of the data that are sent by the host.

According to a second aspect, a data access method is provided. The method is applied to a storage device, and the storage device includes a cache control unit, an interface card, a cache, and a storage subsystem. The method is a method for accessing the storage device in a data read access manner. In the method, the interface card receives a first data read instruction sent by a host. The first data read instruction includes a destination address. The interface card generates a second data read instruction, and writes the second data read instruction into the cache. The second data read instruction includes the destination address and a cache address, the destination address is used to indicate an address at which data is written into the storage subsystem, and the cache address is an address at which data is to be written into the cache from the storage subsystem. The cache control unit sends the second data read instruction to the storage subsystem. The storage subsystem reads the data from storage space corresponding to the destination address, and writes the data into the cache according to the cache address. The interface card reads the data from the cache, and sends the data to the host.

In the method for accessing the storage device in the data read access manner, after the interface card receives the first data read instruction, the interface card generates the second data read instruction, and writes the second data read instruction into the cache. No resource of a processor of the storage device is used. The cache control unit sends the second data read instruction to the storage subsystem to instruct the storage subsystem to execute the second data read instruction. When the host needs to frequently perform data access to the storage subsystem of the storage device, according to the method provided in the present disclosure, no processing resource of the processor of the storage device is consumed, a processing rate for processing another event by the processor of the storage device is improved, and a rate for accessing the storage subsystem of the storage device by the host is improved.

Based on the second aspect, in a first implementation, the interface card includes a microprocessor, the cache is in the interface card and is connected to the microprocessor, and the cache control unit is in the interface card. The cache is in the interface card, and the cache of the interface card stores the data, the destination address of the data, and the second data read instruction, in order to save a system memory resource of the storage device.

Based on the second aspect, in a second implementation, the interface card includes a microprocessor, the cache is in the microprocessor, and the cache control unit is in the interface card. The cache is in the interface card, and the cache of the interface card stores the data, the destination address of the data, and the second data read instruction, in order to save a system memory resource of the storage device.

Based on the second aspect, in a third implementation, the storage device further includes a processor, the cache is connected to the processor, and the cache is outside the interface card.

Based on any one of the second aspect, or the first to the third implementations of the second aspect, in a fourth implementation, after the interface card generates the second data read instruction, and before the cache control unit sends the second data read instruction to the storage subsystem, the method further includes sending, by the interface card, a third data read instruction to the storage subsystem. The third data read instruction is used to instruct the storage subsystem to obtain the second data read instruction from the cache in a direct memory access manner. In this implementation, the second data read instruction is sent to the storage subsystem in the direct memory access manner, in order to improve efficiency of accessing the storage subsystem in the storage device. The third data read instruction is generated and sent by the microprocessor of the interface card to the storage subsystem, and no resource of the processor of the storage device is used. When the host needs to frequently perform data access to the storage subsystem of the storage device, the interface card sends the third data read instruction in the present disclosure, such that no processing resource of the processor of the storage device is consumed, the processing rate for processing another event by the processor of the storage device is improved, and the rate for accessing the storage subsystem of the storage device by the host is improved.

According to a third aspect, a data access method is provided. The method is applied to a storage device, and the storage device includes a cache control unit, an interface card, a cache, and a storage subsystem. The method is a method for accessing the storage device in an administrative command access manner. In the method, the interface card receives a first data read instruction sent by a host. The interface card generates a second data read instruction, and writes the second data read instruction into the cache. The second data read instruction includes a cache address, and the cache address is an address at which data is to be written into the cache from the storage subsystem. The cache control unit sends the second data read instruction to the storage subsystem. The storage subsystem obtains the data after executing the second data read instruction, and the storage subsystem writes the data into the cache according to the cache address. The interface card reads the data from the cache, and sends the data to the host.

In the method for accessing the storage device in the administrative command access manner, after the interface card receives the first data read instruction, the interface card generates the second data read instruction, and writes the second data read instruction into the cache. No resource of a processor of the storage device is used. The cache control unit sends the second data read instruction to the storage subsystem to instruct the storage subsystem to execute the second data read instruction. When the host needs to frequently perform data access to the storage subsystem of the storage device, according to the method provided in the present disclosure, no processing resource of the processor of the storage device is consumed, a processing rate for processing another event by the processor of the storage device is improved, and a rate for accessing the storage subsystem of the storage device by the host is improved.

Based on the third aspect, in a first implementation, the interface card includes a microprocessor, the cache is in the interface card and is connected to the microprocessor, and the cache control unit is in the interface card. The cache is in the interface card, and the cache of the interface card stores the data and the second data read instruction, in order to save a system memory resource of the storage device.

Based on the third aspect, in a second implementation, the interface card includes a microprocessor, the cache is in the microprocessor, and the cache control unit is in the interface card. The cache is in the interface card, and the cache of the interface card stores the data and the second data read instruction, in order to save a system memory resource of the storage device.

Based on the third aspect, in a third implementation, the storage device further includes a processor, the cache is connected to the processor, and the cache is outside the interface card.

Based on any one of the third aspect, or the first to the third implementations of the third aspect, in a fourth implementation, after the interface card generates the second data read instruction, and before the cache control unit sends the second data read instruction to the storage subsystem, the method further includes sending, by the interface card, a third data read instruction to the storage subsystem. The third data read instruction is used to instruct the storage subsystem to obtain the second data read instruction from the cache in a direct memory access manner. In this implementation, the second data read instruction is sent to the storage subsystem in the direct memory access manner, in order to improve efficiency of accessing the storage subsystem in the storage device. The third data read instruction is generated and sent by the interface card to the storage subsystem, and no resource of the processor of the storage device is used. When the host needs to frequently perform data access to the storage subsystem of the storage device, the interface card sends the third data read instruction in the present disclosure, such that no processing resource of the processor of the storage device is consumed, the processing rate for processing another event by the processor of the storage device is improved, and the rate for accessing the storage subsystem of the storage device by the host is improved.

According to a fourth aspect, an interface card is provided. The interface card includes modules that are configured to perform the data access method in any one of the first aspect or the possible implementations of the first aspect, and the modules may be implemented by hardware, or may be implemented by hardware by executing corresponding software.

According to a fifth aspect, an interface card is provided. The interface card includes modules that are configured to perform the data access method in any one of the second aspect or the possible implementations of the second aspect, and the modules may be implemented by hardware, or may be implemented by hardware by executing corresponding software.

According to a sixth aspect, an interface card is provided. The interface card includes modules that are configured to perform the data access method in any one of the third aspect or the possible implementations of the third aspect, and the modules may be implemented by hardware, or may be implemented by hardware by executing corresponding software.

According to a seventh aspect, an interface card is provided. The interface card is applied to a storage device, the interface card includes a network interface device and a microprocessor, the network interface device is connected to the microprocessor, and the storage device includes a cache control unit, a cache, and a storage subsystem. The network interface device is configured to receive a first data write instruction sent by a host. The microprocessor is configured to: obtain data and a destination address of the data; write the data and the destination address into the cache; generate a second data write instruction; and write the second data write instruction into the cache. The destination address is used to indicate an address at which the data is to be written into the storage subsystem, the second data write instruction includes a source address and the destination address, and the source address is an address at which the data is stored in the cache. The second data write instruction is used to instruct the storage subsystem to read the data from the cache according to the source address, and write the data into storage space corresponding to the destination address, and the second data write instruction in the cache is sent by the cache control unit to the storage subsystem. In this interface card, the data is written into the cache in two implementations. If the cache control unit is in the microprocessor, the microprocessor obtains the data, and writes the data into the cache. If the cache control unit is outside the microprocessor, the cache control unit obtains the data, and writes the data into the cache.

The interface card provided in this application accesses the storage subsystem in a data write access manner. After the network interface device receives the first data write instruction, the microprocessor of the interface card generates the second data write instruction, and writes the second data write instruction into the cache. No resource of a processor of the storage device is used. The cache control unit sends the second data write instruction to the storage subsystem to instruct the storage subsystem to execute the second data write instruction. When the host needs to frequently perform data access to the storage subsystem of the storage device, using the interface card provided in the present disclosure, no processing resource of the processor of the storage device is consumed, a processing rate for processing another event by the processor of the storage device is improved, and a rate for accessing the storage subsystem of the storage device by the host is improved.

Based on the seventh aspect, in a first implementation, the cache is in the interface card and is connected to the microprocessor, and the cache control unit is in the interface card. The cache is in the interface card, and the cache of the interface card stores the data, the destination address of the data, and the second data write instruction, in order to save a system memory resource of the storage device.

Based on the seventh aspect, in a second implementation, the cache is in the microprocessor, and the cache control unit is in the interface card. The cache is in the microprocessor of the interface card, and the cache of the interface card stores the data, the destination address of the data, and the second data write instruction, in order to save a system memory resource of the storage device.

Based on the seventh aspect, in a third implementation, the microprocessor is further configured to send a third data write instruction to the storage subsystem. The third data write instruction is used to instruct the storage subsystem to obtain the second data write instruction from the cache in a direct memory access manner. In this implementation, the second data write instruction is sent to the storage subsystem in the direct memory access manner, in order to improve efficiency of accessing the storage subsystem in the storage device. The third data write instruction is generated and sent by the microprocessor of the interface card to the storage subsystem, and no resource of the processor of the storage device is used. When the host needs to frequently perform data access to the storage subsystem of the storage device, the microprocessor of the interface card sends the third data write instruction in the present disclosure, such that no processing resource of the processor of the storage device is consumed, the processing rate for processing another event by the processor of the storage device is improved, and the rate for accessing the storage subsystem of the storage device by the host is improved.

Based on any one of the seventh aspect, or the first to the third implementations of the seventh aspect, in a fourth implementation, the cache includes at least one submission queue, and the microprocessor is further configured to write the second data write instruction into the submission queue.

Based on any one of the seventh aspect, or the first to the fourth implementations of the seventh aspect, in a fifth implementation, the network interface device is further configured to obtain the data and the destination address of the data from the first data write instruction.

Based on any one of the seventh aspect, or the first to the fourth implementations of the seventh aspect, in a sixth implementation, the network interface device is further configured to receive, in a remote direct memory manner, the data and the destination address of the data that are sent by the host.

According to an eighth aspect, an interface card is provided. The interface card is applied to a storage device, the interface card includes a network interface device and a microprocessor, the network interface device is connected to the microprocessor, and the storage device includes a cache control unit, a cache, and a storage subsystem. The network interface device is configured to receive a first data read instruction sent by a host. The first data read instruction includes a destination address, and the destination address is used to indicate an address at which data is written into the storage subsystem. The microprocessor is configured to: generate a second data read instruction; and write the second data read instruction into the cache. The second data read instruction includes the destination address and a cache address, and the cache address is an address at which data is to be written into the cache from the storage subsystem. The second data read instruction is used to instruct the storage subsystem to read the data from storage space corresponding to the destination address, and write the data into the cache according to the cache address. The second data read instruction is in the cache, and the second data read instruction in the cache is sent by the cache control unit to the storage subsystem. The microprocessor is further configured to: read the data from the cache; and send the data to the host.

The interface card provided in this application accesses the storage subsystem in a data read access manner. After the network interface device receives the first data read instruction, the microprocessor of the interface card generates the second data read instruction, and writes the second data read instruction into the cache. No resource of a processor of the storage device is used. The cache control unit sends the second data read instruction to the storage subsystem to instruct the storage subsystem to execute the second data read instruction. When the host needs to frequently perform data access to the storage subsystem of the storage device, using the interface card provided in the present disclosure, no processing resource of the processor of the storage device is consumed, a processing rate for processing another event by the processor of the storage device is improved, and a rate for accessing the storage subsystem of the storage device by the host is improved.

Based on the eighth aspect, in a first implementation, the cache is in the interface card and is connected to the microprocessor, and the cache control unit is in the interface card. The cache is in the interface card, and the cache of the interface card stores the data, the destination address of the data, and the second data read instruction, in order to save a system memory resource of the storage device.

Based on the eighth aspect, in a second implementation, the cache is in the microprocessor, and the cache control unit is in the interface card. The cache is in the microprocessor of the interface card, and the cache of the interface card stores the data, the destination address of the data, and the second data read instruction, in order to save a system memory resource of the storage device.

Based on any one of the eighth aspect, or the first or the second implementation of the eighth aspect, in a third implementation, the microprocessor is further configured to send a third data read instruction to the storage subsystem. The third data read instruction is used to instruct the storage subsystem to obtain the second data read instruction from the cache in a direct memory access manner. In this implementation, the second data read instruction is sent to the storage subsystem in the direct memory access manner, in order to improve efficiency of accessing the storage subsystem in the storage device. The third data read instruction is generated and sent by the microprocessor of the interface card to the storage subsystem, and no resource of the processor of the storage device is used. When the host needs to frequently perform data access to the storage subsystem of the storage device, the microprocessor of the interface card sends the third data read instruction in the present disclosure, such that no processing resource of the processor of the storage device is consumed, the processing rate for processing another event by the processor of the storage device is improved, and the rate for accessing the storage subsystem of the storage device by the host is improved.

According to a ninth aspect, an interface card is provided. The interface card is applied to a storage device, the interface card includes a network interface device and a microprocessor, the network interface device is connected to the microprocessor, and the storage device includes a cache control unit, a cache, and a storage subsystem. The network interface device is configured to receive a first data read instruction sent by a host. The microprocessor is configured to: generate a second data read instruction; and write the second data read instruction into the cache. The second data read instruction includes a cache address, and the cache address is an address at which data is to be written into the cache from the storage subsystem. The second data read instruction is used to instruct the storage subsystem to execute the second data read instruction. The storage subsystem obtains the data after executing the second data read instruction, and the storage subsystem writes the data into the cache according to the cache address. The second data read instruction is in the cache, and the second data read instruction in the cache is sent by the cache control unit to the storage subsystem. The microprocessor is further configured to: read the data from the cache; and send the data to the host.

The interface card provided in this application accesses the storage subsystem in an administrative command access manner. After the network interface device receives the first data read instruction, the microprocessor of the interface card generates the second data read instruction, and writes the second data read instruction into the cache. No resource of a processor of the storage device is used. The cache control unit sends the second data read instruction to the storage subsystem to instruct the storage subsystem to execute the second data read instruction. When the host needs to frequently perform data access to the storage subsystem of the storage device, using the interface card provided in the present disclosure, no processing resource of the processor of the storage device is consumed, a processing rate for processing another event by the processor of the storage device is improved, and a rate for accessing the storage subsystem of the storage device by the host is improved.

Based on the ninth aspect, in a first implementation, the cache is in the interface card and is connected to the microprocessor, and the cache control unit is in the interface card. The cache is in the interface card, and the cache of the interface card stores the data and the second data read instruction, in order to save a system memory resource of the storage device.

Based on the ninth aspect, in a second implementation, the cache is in the microprocessor, and the cache control unit is in the interface card. The cache is in the microprocessor of the interface card, and the cache of the interface card stores the data and the second data read instruction, in order to save a system memory resource of the storage device.

Based on any one of the ninth aspect, or the first or the second implementation of the ninth aspect, in a third implementation, the microprocessor is further configured to send a third data read instruction to the storage subsystem. The third data read instruction is used to instruct the storage subsystem to obtain the second data read instruction from the cache in a direct memory access manner. In this implementation, the second data read instruction is sent to the storage subsystem in the direct memory access manner, in order to improve efficiency of accessing the storage subsystem in the storage device. The third data read instruction is generated and sent by the microprocessor of the interface card to the storage subsystem, and no resource of the processor of the storage device is used. When the host needs to frequently perform data access to the storage subsystem of the storage device, the microprocessor of the interface card sends the third data read instruction in the present disclosure, such that no processing resource of the processor of the storage device is consumed, the processing rate for processing another event by the processor of the storage device is improved, and the rate for accessing the storage subsystem of the storage device by the host is improved.

According to a tenth aspect, a storage device is provided. The storage device includes the interface card in any one of the fourth aspect or the possible implementations of the fourth aspect or in any one of the seventh aspect or the possible implementations of the seventh aspect, and the storage device further includes a cache control unit, a cache, and a storage subsystem. The interface card is configured to: receive a first data write instruction sent by a host; and obtain data and a destination address of the data. The destination address is used to indicate an address at which the data is to be written into the storage subsystem. The interface card is further configured to: write the data and the destination address into the cache; generate a second data write instruction; and write the second data write instruction into the cache. The second data write instruction includes a source address and the destination address, and the source address is an address at which the data is stored in the cache. The cache control unit is configured to send the second data write instruction in the cache to the storage subsystem. The storage subsystem is configured to: read the data from the cache according to the source address; and write the data into storage space corresponding to the destination address.

According to an eleventh aspect, a storage device is provided. The storage device includes the interface card in any one of the fifth aspect or the possible implementations of the fifth aspect or in any one of the eighth aspect or the possible implementations of the eighth aspect, and the storage device further includes a cache control unit, a cache, and a storage subsystem. The interface card is configured to receive a first data read instruction sent by the host. The first data read instruction includes a destination address. The interface card is further configured to: generate a second data read instruction; and write the second data read instruction into the cache. The second data read instruction includes the destination address and a cache address, and the cache address is an address at which data is to be written into the cache from the storage subsystem. The cache control unit is configured to send the second data read instruction in the cache to the storage subsystem. The storage subsystem is further configured to: read the data from storage space corresponding to the destination address; and write the data into the cache according to the cache address. The interface card is further configured to: read the data from the cache; and send the data to the host.

According to a twelfth aspect, a storage device is provided. The storage device includes the interface card in any one of the sixth aspect or the possible implementations of the sixth aspect or in any one of the ninth aspect or the possible implementations of the ninth aspect, and the storage device further includes a cache control unit, a cache, and a storage subsystem. The interface card is configured to receive a first data read instruction sent by a host. The interface card is further configured to: generate a second data read instruction; and write the second data read instruction into the cache. The second data read instruction includes a cache address, and the cache address is an address at which data is to be written into the cache from the storage subsystem. The cache control unit is configured to send the second data read instruction in the cache to the storage subsystem. The storage subsystem is configured to execute the second data read instruction, the storage subsystem obtains the data after executing the second data read instruction, and the storage subsystem writes the data into the cache according to the cache address after obtaining the data. The interface card is further configured to: read the data from the cache; and send the data to the host.

According to a thirteenth aspect, a computer readable storage medium is provided. The computer readable storage medium stores an instruction, and when run on a computer, the instruction causes the computer to perform the data access method in any one of the first aspect or the possible implementation of the first aspect or in any one of the second aspect or the possible implementation of the second aspect or in any one of the third aspect or the possible implementation of the third aspect.

According to the data access method and the apparatus that are provided in this application, after the interface card receives the first data write instruction or the first data read instruction, the interface card generates the second data write instruction or the second data read instruction, and writes the second data write instruction or the second data read instruction into the cache. No resource of the processor of the storage device is used. The cache control unit sends the second data write instruction or the second data read instruction to the storage subsystem, and no resource of the processor of the storage device is used. Alternatively, the cache control unit may instruct the storage subsystem to execute the second data write instruction or the second data read instruction. When the host needs to frequently perform data access to the storage subsystem of the storage device, according to the data access method and the apparatus that are provided in the present disclosure, no processing resource of the processor of the storage device is consumed, the processing rate for processing another event by the processor of the storage device is improved, and the rate for accessing the storage subsystem of the storage device by the host is improved.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The technical solutions according to embodiments of the present disclosure are clearly described in the following with reference to the accompanying drawings.

Figure 1:
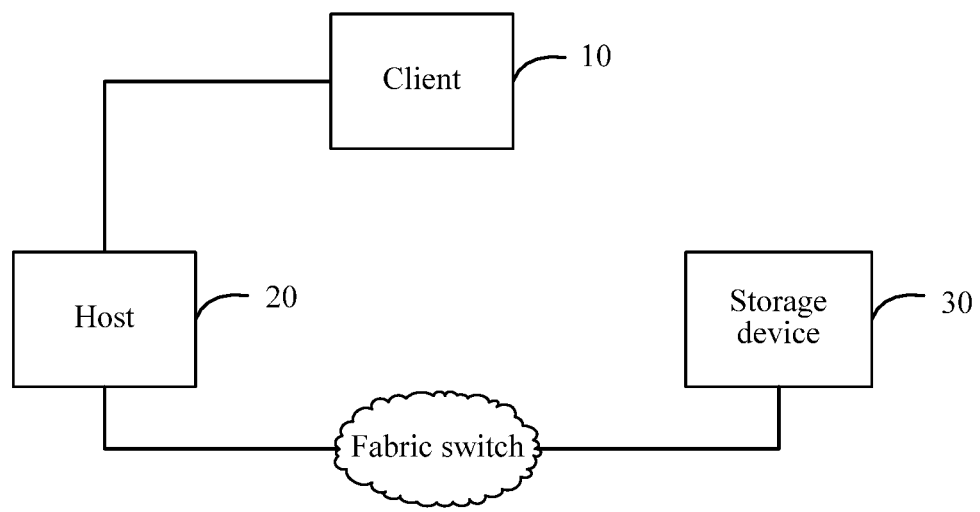
FIG. 1 is a composition diagram of a storage system according to an embodiment of the present disclosure.

Referring to FIG. 1, FIG. 1 is a composition diagram of a storage system according to an embodiment of the present disclosure. As shown in FIG. 1, the storage system provided in this embodiment of the present disclosure includes a client 10, a host 20, and a storage device 30. The client 10 communicates with the host 20. A user sends an access request to the host 20 using the client 10. The access request may be a write access request, a read access request, or an administrative access request. The host 20 communicates with the storage device 30, and communication and connection between the host 20 and the storage device 30 may be implemented using a fabric switch. After receiving the access request sent by the client 10, the host 20 accesses the storage device 30.

The host 20 may be any computing device such as a server or a desktop computer, and the server may be a high-density server, a rack server, or a blade server.

The storage device 30 may be a computing device, a server, a computer, or the like.

An example of a structure of the host 20 and an example of a structure of the storage device 30 in the storage system shown in FIG. 1 are separately described below.

Figure 2:
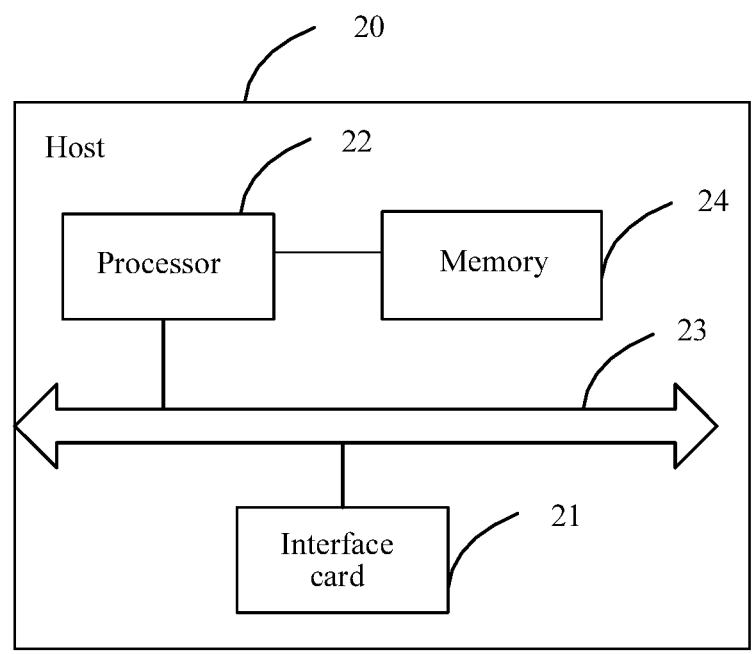
FIG. 2 is a structural diagram of a host 20 according to an embodiment of the present disclosure.

Referring to FIG. 2, FIG. 2 is a structural diagram of a host 20 according to an embodiment of the present disclosure. As shown in FIG. 2, the host 20 provided in this embodiment includes an interface card 21, a processor 22, a communications bus 23, and a memory 24. The interface card 21 and the processor 22 are connected using the communications bus 23. The processor 22 and the memory 24 are connected using a memory bus. If the host 20 stores information such as data or an instruction in the memory 24, the host 20 stores the information such as data or an instruction in the memory 24 using a cache control unit. The cache control unit is in the processor 22 and is connected to the memory 24 using the memory bus. Alternatively, in another implementation, the cache control unit is outside the processor 22 and is separately connected to the memory 24 and the processor 22. The cache control unit is connected to the memory 24 using the memory bus. The cache control unit is in the host 20.

The interface card 21 includes a network interface device that is configured to receive or send information. In this implementation, the interface card 21 is a network interface device.

The processor 22 may be any computing component such as a microcontroller, a programmable controller, or a central processing unit (CPU). The processor 22 is a "brain" of the host 20, and is configured to receive and process a command or information that is sent by a client 10.

The communications bus 23 is a Peripheral Component Interconnect Express (PCIE) bus. In this implementation, the communications bus 23 is configured to implement communication and connection between the interface card 21 and the processor 22.

The memory 24 is configured to provide cache space for an application on the host 20. The memory 24 includes a volatile memory, a non-volatile memory, or a combination thereof. The volatile memory is, for example, a random-access memory (RAM). The non-volatile memory is any machine-readable medium capable of storing program code, such as a floppy disk, a hard disk, a solid state disk (SSD), or an optical disc. The memory 24 has a power failure protection function. The power failure protection function means that data stored in the memory 24 is not lost when a system is powered off and then powered on again. There may be one or more memories 24. In this implementation, the memory 24 is configured to store an instruction, data, or information.

Figure 3:
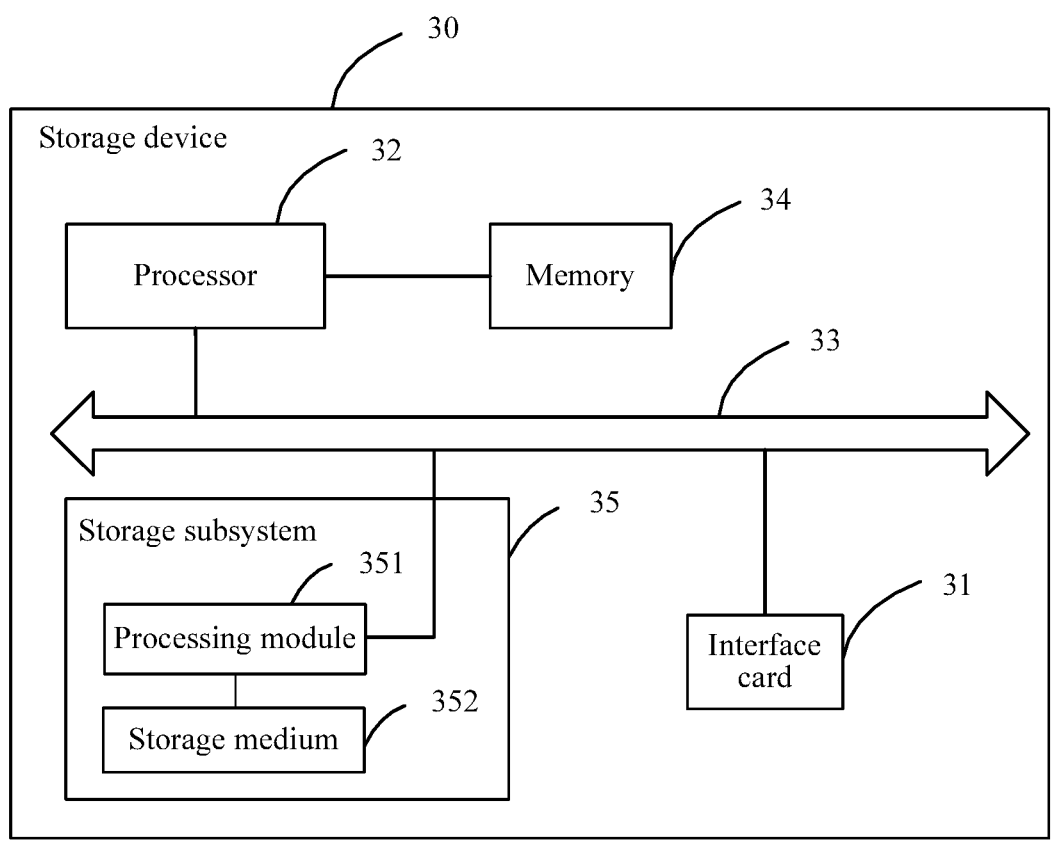
FIG. 3 is a structural diagram of a storage device 30 according to an embodiment of the present disclosure.

Referring to FIG. 3, FIG. 3 is a structural diagram of a storage device 30 according to an embodiment of the present disclosure. As shown in FIG. 3, the storage device 30 provided in this embodiment includes an interface card 31, a processor 32, a communications bus 33, a memory 34, and a storage subsystem 35. The interface card 31 and the processor 32 are connected using the communications bus 33. The processor 32 and the memory 34 are connected using a memory bus.

In the storage device 30 shown in FIG. 3, a function and an implementation of each component included in the storage device 30 are described below.

The storage subsystem 35 is a non-volatile memory, for example, a solid state disk. The solid state disk may be a solid state disk having a PCIE interface, an Serial Advanced Technology Attachment (SATA) interface, or a Parallel Advanced Technology Attachment (PATA) interface. The storage subsystem 35 implements a storage function according to a preset standard protocol. The preset standard protocol includes the Non-Volatile Memory Express (NVME) protocol or the Non-Volatile Memory Express over Fabric (NVMe-oF) protocol. In this implementation, the storage subsystem 35 is configured to store data or information, the preset standard protocol is the NVME protocol, and the storage subsystem 35 is a solid state disk having the Peripheral Component Interconnect Express (PCIE) SSD interface.

As shown in FIG. 3, the storage subsystem 35 provided in this embodiment includes a processing module 351 and a storage medium 352, and the processing module 351 communicates with the storage medium 352. In this implementation, the processing module 351, the interface card 31, and the processor 32 are connected using the communications bus 33. The processor 32 and the memory 34 are connected using the memory bus. In this implementation, if the storage device 30 stores information such as data or an instruction in the memory 34, the storage device 30 stores the information such as data or an instruction in the memory 34 using a cache control unit. The cache control unit is in the storage device 30, and the cache control unit in the storage device 30 and a cache control unit in a host 20 are two separate cache control units. The cache control unit in the storage device 30 is in the processor 32 and is connected to the memory 34 using the memory bus. Alternatively, in another implementation, the cache control unit in the storage device 30 is outside the processor 32 and is separately connected to the memory 34 and the processor 32. The cache control unit in the storage device 30 is connected to the memory 34 using the memory bus. In the storage subsystem 35, the processing module 351 may be any computing component such as a microcontroller or a programmable controller. The processing module 351 is configured to receive and execute an instruction. The storage medium 352 usually includes one or more flash memory chips. The storage medium 352 is configured to store data.

The interface card 31 includes an interface card or a network interface device that is configured to receive or send information. The interface card 31 may be a network interface card (NIC) supporting an Ethernet protocol, an interface card based on an InfiniBand protocol, or another interface card that can implement the Remote Direct Memory Access (RDMA) Protocol.

In the storage device 30 shown in FIG. 3, the processor 32 may be any computing component such as a microcontroller or a programmable controller. In this implementation, the processor 32 is a CPU. The processor 32 is a "brain" of the storage device 30, and is configured to receive and process information sent by the interface card 31. The processor 32 is further configured to send a destination address to the host 20. The destination address is used to indicate an address at which the data is to be written into the storage subsystem 35. The destination address may be an address or an address range.

The communications bus 33 is a PCIE bus. In this implementation, the communications bus 33 is configured to implement communication and connection among the interface card 31, the processor 32, and the storage subsystem 35.

In the storage device 30 shown in FIG. 3, the memory 34 is configured to provide cache space for an application on the storage device 30, and is further configured to store at least one queue. Each queue is a first in first out command pipeline, and is configured to connect the host 20 and the storage device 30. A command sent from the host 20 to the storage device 30 is stored in a submission queue, and a completion command sent from the storage device 30 to the host 20 is stored in a completion queue. A request or an instruction that is sent by the host 20 using an interface card 21 is stored in the storage device 30 using a submission queue. Then, the processor 32 processes the request or the instruction in the submission queue according to a first in first out principle, encapsulates a corresponding completion result into a completion command, and stores the completion command in a completion queue. Next, the processor 32 returns the completion command in the completion queue to the host 20 according to the first in first out principle. The memory 34 includes a volatile memory, a non-volatile memory, or a combination thereof. The volatile memory is, for example, a random-access memory (RAM). The non-volatile memory is any machine-readable medium capable of storing program code, such as a floppy disk, a hard disk, an SSD, or an optical disc. The memory 34 has a power failure protection function. The power failure protection function means that data stored in the memory 34 is not lost when a system is powered off and then powered on again. There may be one or more memories 34. The memory 34 is configured to store an instruction, data, or information.

Based on the storage system shown in FIG. 1, a manner in which the host 20 accesses the storage device 30 includes a data write access manner and a data read access manner.

A data access method that is in the storage system and provided in this implementation is described below with reference to the storage system shown in FIG. 1, the host shown in FIG. 2, and the storage device shown in FIG. 3. An access manner in which the host 20 accesses the storage device 30 includes a data write access manner and a data read access manner. The two data access manners in which the host 20 accesses the storage device 30 and that are provided in this implementation are separately described below.

An implementation of the data write access manner in which the host 20 accesses the storage device 30 is first described below.

In the data write access manner, the storage device 30 sends a destination address to the host 20 in advance. After obtaining the destination address, the host 20 stores the destination address in the memory 24. The destination address is used to indicate an address at which the data is to be written into the storage subsystem 35. The destination address may be an address or an address range.

The data write access manner in which the host 20 accesses the storage device 30 is as follows. After the host 20 receives a first data write request sent by a user using the client 10, the host 20 accesses the storage device 30 in a remote direct memory access (RDMA) manner, to store the data in the memory 34 of the storage device 30.

After the storage system sends the data to the storage device 30, the host 20 sends a first data write instruction to the processor 32 of the storage device 30. The processor 32 updates the first data write instruction, obtains an updated second data write instruction, and stores the updated second data write instruction in the memory 34 of the storage device 30. In this implementation, the processor 32 may store the updated second data write instruction in a submission queue in the memory 34. Further, in this implementation, an implementation in which the processor 32 stores the updated second data write instruction is as follows. The processor 32 sends the updated second data write instruction to a memory controller unit, and the cache control unit stores the updated second data write instruction in the memory 34. The cache control unit is connected to the memory 34 using a memory bus, and the cache control unit may be in the processor 32, or may be connected to the processor 32. In this implementation, the first data write instruction before the updating includes the destination address of the data, and the destination address is used to indicate storage space corresponding to the destination address at which the storage device 30 writes the data into the storage subsystem 35. The updated second data write instruction further includes a source address of the data, and the source address is an address at which the data is stored in the memory 34.

There are various manners of sending the data and the destination address of the data. In the foregoing implementation, the data is stored by the host 20 in the memory 34 of the storage device 30 in the RDMA manner. The destination address of the data is included in the first data write instruction, and the destination address of the data is sent to the storage device 30 by sending the first data write instruction. In another implementation, the host 20 may encapsulate both the data and the destination address in the first data write instruction. After the host 20 sends the first data write instruction to the storage device 30, the processor 32 updates the first data write instruction, and stores the updated second data write instruction in the memory 34.

After updating the first data write instruction, the processor 32 sends a third data write instruction to the processing module 351 of the storage subsystem 35. In this implementation, the processing module 351 of the storage subsystem 35 reads the second data write instruction in the memory 34 according to the third data write instruction in a direct memory access (DMA) manner.

After reading the second data write instruction, the processing module 351 processes the updated second data write instruction, that is, reads the data in the memory 34 according to the source address of the data in the DMA manner, to write the data into the storage space to which the destination address points.

In this implementation, after the processor 32 updates the first data write instruction, the third data write instruction sent by the processor 32 is used to instruct the processing module 351 to obtain the updated second data write instruction in the DMA manner. The sent third data write instruction includes an address at which the updated second data write instruction is stored in the memory 34. If the updated second data write instruction is stored in the memory 34 in a form of a linked list, the third data write instruction sent by the processor 32 includes a head address at which the updated second data write instruction is stored in the memory 34, that is, a head address of the linked list. Further, the processor 32 sends the address at which the updated second data write instruction is stored in the memory 34 to a register of the processing module 351, to instruct the processing module 351 to obtain, in the DMA manner according to the address at which the updated second data write instruction is stored in the memory 34, the stored updated second data write instruction from storage space to which the address at which the updated second data write instruction is stored in the memory 34 points, in order to obtain the source address and the destination address of the data from the submission queue of the memory 34.

In the data write access manner, an implementation in which the processing module 351 processes the updated second data write instruction to obtain the data in the memory 34 according to the source address of the data in the DMA manner is as follows. The processing module 351 obtains, in the DMA manner, the data in the memory 34 from storage space to which the source address points. Further, the processing module 351 takes over the communications bus 33 from the processor 32, and controls the communications bus 33 to transmit the data to the processing module 351.

In the data write access manner, after the processing module 351 writes the data into the storage space in the storage medium 352 that is indicated by the destination address, the processing module 351 sends a write completion command to a completion queue of the memory 34 in the DMA manner. Then, the processing module 351 sends an interrupt request to the processor 32 to report that DMA data transmission is completed. After receiving the interrupt request, the processor 32 obtains the write completion command from the completion queue of the memory 34 according to a first in first out principle, and sends the write completion command to the interface card 31, in order to send the write completion command to the host 20 using the interface card 31, and notify the host 20 that the storage device 30 has written the data into the destination address.

In the foregoing implementation of the data write access manner, the host 20 sends the data to the storage device 30 in the RDMA manner. Further, there are two implementations in which the host 20 sends the data to the storage device 30 in the RDMA manner. In a first implementation, the processor 22 of the host 20 generates an RDMA write access request, and sends the RDMA write access request to the interface card 21. After the interface card 21 receives the RDMA write access request, the interface card 21 reads RDMA write access information from the memory 24. The RDMA write access information includes the data. The interface card 21 sends the RDMA write access information to the interface card 31 of the storage device 30, and the interface card 31 sends the RDMA write access information to the memory 34 to store the data. In the first implementation in which the host 20 sends the data to the storage device 30 in the RDMA manner, the destination address is included in the first data write instruction before the updating, the first data write instruction is included in the RDMA write access request, and the RDMA write access request further includes an address at which the data is stored in the memory 24. After receiving the RDMA write access request, the interface card 21 sends the first data write instruction to the interface card 31. The interface card 21 sends the destination address of the data to the interface card 31 by sending the first data write instruction. The interface card 21 obtains, according to the address that is in the RDMA write access request and at which the data is stored in the memory 24, the RDMA write access information including the data from storage space to which the address at which the data is stored in the memory 24 points, and the interface card 21 sends the data to the interface card 31 by sending the RDMA write access information.

In the first implementation in which the host 20 sends the data to the storage device 30 in the RDMA manner, the RDMA write access request includes the first data write instruction. In another implementation, the RDMA write access request may not include the first data write instruction, the first data write instruction is independent of the RDMA write access request, and the address at which the data is stored in the memory 24 is included in the RDMA write access request. The processor 22 of the host 20 separately sends, to the interface card 21, the first data write instruction and the address at which the data is stored in the memory 24.

In the first implementation in which the host 20 sends the data to the storage device 30 in the RDMA manner, the RDMA write access information includes the data. In another implementation, the RDMA write access information may further include description information such as a length of the data, an access type of the data, or an access priority of the data. In addition to the destination address of the data, the updated second data write instruction further includes the description information of the data.

In the first implementation in which the host 20 sends the data to the storage device 30 in the RDMA manner, the data and the description information of the data are included in one piece of RDMA write access information. In another implementation, the data and the description information of the data such as the length of the data, the access type of the data, and the access priority of the data may be encapsulated using a plurality of pieces of RDMA write access information. If the data and the description information of the data such as the length of the data, the access type of the data, and the access priority of the data are encapsulated using the plurality of pieces of RDMA write access information, the plurality of pieces of RDMA write access information may be simultaneously sent, or may be separately sent without a limitation on a sending sequence.

In a second implementation in which the host 20 sends the data to the storage device 30 in the RDMA manner, the host 20 sends, to the storage device 30, an address of the data in the memory 24 of the host 20, and instructs the storage device 30 to read the data from the host 20 in the RDMA manner according to the address of the data in the memory 24 of the host 20. An implementation is as follows. The processor 22 of the host 20 generates an RDMA write access request, and sends the RDMA write access request to the interface card 21. The RDMA write access request includes the first data write instruction and the address at which the data is stored in the memory 24. After the interface card 21 receives the RDMA write access request, the interface card 21 sends the RDMA write access request to the interface card 31 of the storage device 30. After receiving the RDMA write access request, the interface card 31 sends the RDMA write access request to the memory 34 to store the first data write instruction and the address at which the data is stored in the memory 24 of the host 20. After receiving the RDMA write access request, the interface card 31 sends the RDMA write access request to the processor 32. After receiving the RDMA write access request, the processor 32 stores the RDMA write access request in the memory 34 using the cache control unit. Then, the processor 32 reads, from the memory 34, the address at which the data is stored in the memory 24 of the host 20. The processor 32 sends, to the interface card 21 of the host 20 using the interface card 31, the address at which the data is stored in the memory 24 of the host 20. After receiving the address at which the data is stored in the memory 24 of the host 20, the interface card 21 reads the data from the address at which the data is stored in the memory 24 of the host 20, and sends RDMA write access information including the data to the interface card 31 of the storage device 30. Then, the interface card 31 of the storage device 30 sends the data to the memory 34.

In the second implementation in which the host 20 sends the data to the storage device 30 in the RDMA manner, the destination address is included in the first data write instruction before the updating. In another implementation, both the destination address and the address at which the data is stored in the memory 24 of the host 20 may be included in the first data write instruction. Alternatively, in another implementation, in addition to the destination address of the data and the address at which the data is stored in the memory 24 of the host 20, the first data write instruction may further include description information of the data such as a length of the data, an access type of the data, or an access priority of the data. Alternatively, in another implementation, both the data and the description information of the data such as the length of the data, the access type of the data, or the access priority of the data are included in the RDMA write access information.

In the second implementation in which the host 20 sends the data to the storage device 30 in the RDMA manner, both the address at which the data is stored in the memory 24 of the host 20 and the first data write instruction including the destination address of the data are included in the RDMA write access request. In another implementation, the first data write instruction may not be in the RDMA write access request. The first data write instruction is independent of the RDMA write access request, and the address at which the data is stored in the memory 24 is included in the RDMA write access request. The processor 22 of the host 20 separately sends, to the interface card 21, the first data write instruction and the address at which the data is stored in the memory 24.

In the second implementation in which the host 20 sends the data to the storage device 30 in the RDMA manner, the description information of the data and the data are included in one piece of RDMA write access information. In another implementation, the data and the description information of the data such as the length of the data, the access type of the data, or the access priority of the data may be encapsulated using a plurality of pieces of RDMA write access information. If the data and the description information such as the length of the data, the access type of the data, and the access priority of the data are encapsulated using the plurality of pieces of RDMA write access information, the plurality of pieces of RDMA write access information may be simultaneously sent, or may be separately sent without a limitation on a sending sequence. In addition to the destination address of the data, the updated second data write instruction further includes the description information of the data.

Two cases in which the host 20 sends the data or the description information of the data to the storage device 30 in the first RDMA manner and the second RDMA manner are described above. In another implementation, all or a part of the description information such as the length of the data, the access type of the data, or the access priority of the data may be included in the first data write instruction, and the description information of the data is sent to the storage device 30 by sending the first data write instruction. Information that is not included in the first data write instruction may be sent to the storage device 30 in another manner, for example, by sending one or more pieces of RDMA write access information in the RDMA manner. A specific sending manner is not limited in this embodiment.

Next, an implementation of the data read access manner in which the host 20 accesses the storage device 30 is described.

In the data read access manner, the data read access manner in which the host 20 accesses the storage device 30 is as follows. When the host 20 receives a first data read request sent by a user using the client 10, the host 20 creates a first data read instruction using the processor 22. The first data read instruction includes a destination address of data.

The processor 22 sends the first data read instruction to the storage device 30 using the interface card 21.

The storage device 30 receives, using the interface card 31, the first data read instruction sent by the interface card 21, and sends the first data read instruction to the processor 32. After receiving the first data read instruction, the processor 32 updates the first data read instruction, obtains an updated second data read instruction, and stores the updated second data read instruction in the memory 34. The updated second data read instruction includes the destination address of the data and an address at which the data is to be stored in the memory 34. Further, in the data read access manner, the processor 32 stores the updated second data read instruction in a submission queue of the memory 34. In this implementation, similar to the data write access manner, the processor 32 stores the second data read instruction in the memory 34 using the cache control unit. For implementation details of the cache control unit, refer to the content in the data write access manner. Implementation details are not described herein again.

Then, the processor 32 sends a third data read instruction to the processing module 351 of the storage subsystem 35. In this implementation, the processing module 351 of the storage subsystem 35 reads the updated second data read instruction in the memory 34 according to the third data read instruction in a direct memory access DMA manner.

After reading the second data read instruction, the processing module 351 processes the updated second data read instruction, that is, writes, in the DMA manner into storage space corresponding to the destination address at which the data is to be stored in the memory 34 points, the data to which the destination address points.

In this implementation, after the processor 32 updates the first data read instruction, the third data read instruction sent by the processor 32 is used to instruct the processing module 351 to obtain the updated second data read instruction in the DMA manner. The sent third data read instruction includes an address at which the updated second data read instruction is stored in the memory 34. If the updated second data read instruction is stored in the memory 34 in a form of a linked list, the third data read instruction includes a head address at which the updated second data read instruction is stored in the memory 34, that is, a head address of the linked list. Further, the processor 32 sends the address at which the updated second data read instruction is stored in the memory 34 to a register of the processing module 351, to instruct the processing module 351 to obtain, in the DMA manner according to the address at which the updated second data read instruction is stored in the memory 34, the stored updated second data read instruction from storage space to which the address at which the updated second data read instruction is stored in the memory 34 points, in order to obtain, from the submission queue of the memory 34, the destination address of the data and the address at which the data is to be stored in the memory 34.

In the data read access manner, after the processing module 351 writes the data into the memory 34 in the DMA manner, the processing module 351 sends a completion command to a completion queue of the memory 34 in the DMA manner. Then, the processing module 351 sends an interrupt request to the processor 32 to report that DMA data transmission is completed. After receiving the interrupt request, the processor 32 obtains the completion command from the completion queue of the memory 34 according to a first in first out principle. After obtaining the completion command, the processor 32 sends the data to the host 20 in an RDMA manner using the interface card 31, to complete a process of reading and accessing the data by the host 20.

In the data read access manner, after obtaining the completion command, the processor 32 sends the data to the host 20 in two RDMA manners. An implementation in which the processor 32 sends the data to the host 20 in a first RDMA manner is as follows. After obtaining the completion command, the processor 32 sends an RDMA read access request to the interface card 31. After receiving the RDMA read access request, the interface card 31 reads RDMA read access information from the memory 34. The RDMA read access information includes the data. The interface card 31 sends the RDMA read access information to the interface card 21. After receiving the RDMA read access information including the data, the interface card 21 sends the data to the memory 24 to complete a process of reading the data by the host 20.

In the data read access manner, an implementation in which the processor 32 sends the data to the host 20 in a second RDMA manner is as follows. After obtaining the completion command, the processor 32 sends an RDMA read access request to the interface card 31. The interface card 31 obtains RDMA read access information from the memory 34, and the RDMA read access information includes the address at which the data is stored in the memory 34. Then, the interface card 31 sends the RDMA read access information and the RDMA read access request to the interface card 21. After receiving the RDMA read access information, the interface card 21 sends the RDMA read access information to the memory 24 to store the address at which the data is stored in the memory 34. After receiving the RDMA read access request, the interface card 21 sends the RDMA read access request to the processor 22. After receiving the RDMA read access request, the processor 22 stores the RDMA read access request in a submission queue of the memory 24. Then, the processor 22 obtains the RDMA read access request according to the first in first out principle. Then, the processor 22 reads, from the memory 24, the address at which the data is stored in the memory 34, and sends, to the interface card 21, the address at which the data is stored in the memory 34. The interface card 21 sends, to the interface card 31, the address at which the data is stored in the memory 34. After receiving the address at which the data is stored in the memory 34, the interface card 31 reads the data from the memory 34 according to the address at which the data is stored in the memory 34. Then, the interface card 31 sends the data to the interface card 21. After receiving the data, the interface card 21 sends the data to the memory 24 to complete a process of reading the data by the host 20.

Based on the storage device 30 implemented in FIG. 3, when the host 20 accesses the storage subsystem 35 of the storage device 30, after the processor 32 of the storage device 30 receives the first data read instruction or the first data write instruction, the processor 32 of the storage device 30 needs to update the first data read instruction or the first data write instruction, and further needs to store the updated second data read instruction or the updated second data read instruction in a submission queue of the memory 34. In addition, in the data read access manner or the data write access manner, the processor 32 needs to send the third data write instruction or the third data read instruction to the register of the processing module 351, to instruct the processing module 351 to execute the updated second data write instruction or the updated second data read instruction. Therefore, using the storage device 30 shown in FIG. 3, a processing resource and a sending resource of the processor 32 are used in both the data read access manner and the data write access manner in which the host 20 accesses the storage device 30, in order to provide the host 20 with access to the storage subsystem 35. If the host 20 needs to frequently access the storage subsystem 35 of the storage device 30, the processing resource of the processor 32 of the storage device 30 is consumed based on the access manners of the storage device 30 implemented in FIG. 3. In addition, a rate for processing another event by the processor 32 of the storage device 30 is affected, and a rate for accessing the storage subsystem 35 by the host 20 is reduced.

To resolve a problem that the processing resource of the processor 32 of the storage device 30 is strained because the processing resource of the processor 32 is consumed when the host 20 needs to frequently access the storage device 30 shown in FIG. 3, the embodiments of the present disclosure provide another storage device, in order to resolve the problem that the processing resource of the processor 32 of the storage device 30 is strained, and improve the rate for accessing the storage subsystem 35 by the host 20.

Figure 4A:
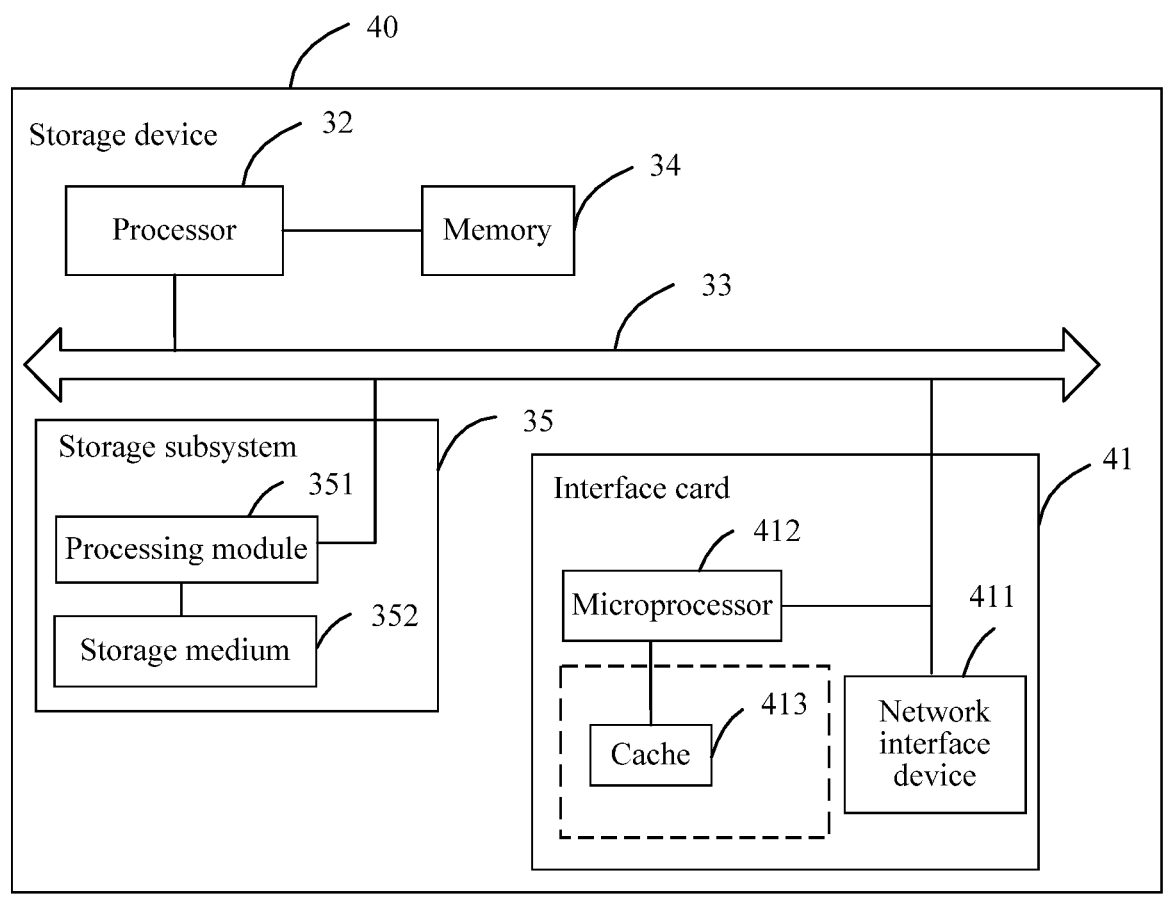
FIG. 4A is a structural diagram of another storage device 40 according to an embodiment of the present disclosure.

Referring to FIG. 4A, FIG. 4A is a structural diagram of another storage device 40 according to an embodiment of the present disclosure. As shown in FIG. 4A, based on the storage device 30 shown in FIG. 3, a difference between the storage device 40 provided in this embodiment and the storage device 30 shown in FIG. 3 lies in that an interface card 41 in the storage device 40 is a smart interface card, and the interface card 41 may be a network interface card (NIC) supporting an Ethernet protocol, an interface card based on an InfiniBand protocol, or another interface card that can implement the Remote Direct Memory Access (RDMA) Protocol. In this implementation, the interface card 41 includes a network interface device 411, a microprocessor 412, and a cache 413, the microprocessor 412 is connected to the network interface device 411, and the cache 413 is connected to the microprocessor 412 using a memory bus. In the storage device 40, the network interface device 411, the microprocessor 412, the processor 32, and the storage subsystem 35 are connected using the communications bus 33. The memory 34 and the processor 32 are connected using another memory bus.

In this implementation, if the storage device 40 stores information such as data or an instruction in the cache 413 of the interface card 41, the storage device 40 stores the information such as data or an instruction in the cache 413 of the interface card 41 using a cache control unit. The cache control unit is in the interface card 41 of the storage device 40, and the cache control unit in the storage device 40, the cache control unit in the host 20, and the cache control unit in the storage device 30 are different and mutually independent. The cache control unit in the interface card 41 of the storage device 40 is in the microprocessor 412 and is connected to the cache 413 of the interface card 41 using the memory bus. Alternatively, in another implementation, the cache control unit in the interface card 41 of the storage device 40 is outside the microprocessor 412 and is separately connected to the cache 413 and the microprocessor 412 of the interface card 41. The cache control unit in the interface card 41 of the storage device 40 is connected to the cache 413 of the interface card 41 using the memory bus.

The network interface device 411 is configured to receive or send information, and is further configured to: send, to the microprocessor 412, information or an instruction that complies with a preset standard protocol specification; and send, to the processor 32, information or an instruction that complies with a protocol specification other than the preset standard protocol specification.

The microprocessor 412 is configured to process the information or the instruction that is received from the network interface device 411 and that complies with the preset standard protocol specification. The microprocessor 412 may be any computing component such as a microcontroller, a programmable controller, or another processing chip.

The cache 413 may include a high-speed RAM memory, and may further include a non-volatile memory, for example, at least one magnetic disk memory. It may be understood that the cache 413 may be any machine-readable medium capable of storing program code, such as a random-access memory (RAM), a magnetic disk, a hard disk, an SSD, or a non-volatile memory. The cache 413 is configured to store data, the instruction, or the information that is received by the microprocessor 412 and that complies with the preset standard protocol specification. The cache 413 is further configured to store at least one queue. For the queue stored in the cache 413, refer to the description of the queue in the memory 34 or a description of a queue in the cache 413 shown in FIG. 4B below.

Figure 4B:
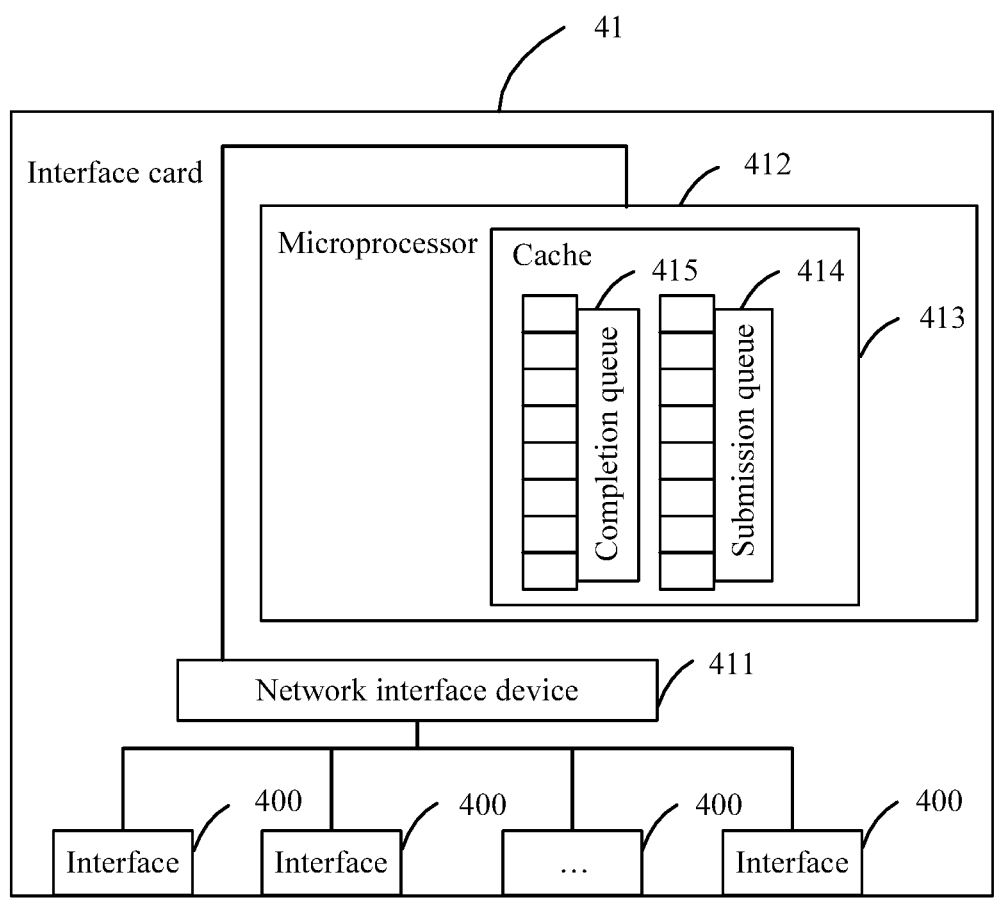
FIG. 4B is a schematic structural diagram of an interface card 41 in another storage device 40 according to an embodiment of the present disclosure.

In a structural implementation of the interface card 41 shown in FIG. 4A, the cache 413 of the interface card 41 is connected to the microprocessor 412. In another implementation, the cache 413 may be integrated into the microprocessor 412, or the cache 413 is a part of the memory 34. Further, a location and a connection manner of the cache 413 are not limited in this embodiment. Referring to FIG. 4B, FIG. 4B is a schematic structural diagram of an interface card 41 in another storage device 40 according to an embodiment of the present disclosure. As shown in FIG. 4B, based on the interface card 41 shown in FIG. 4A, the interface card 41 further includes at least one interface 400 that is connected to the network interface device 411. In addition, different from the interface card 41 shown in FIG. 4A, in the interface card 41 shown in FIG. 4B, the cache 413 is integrated into the microprocessor 412.

In this implementation, the interface 400 is configured to receive data, an instruction, or information that is sent by the interface card 21 of the host 20.

In addition, the cache 413 shown in FIG. 4B is integrated into the microprocessor 412, and includes at least one submission queue 414 and at least one completion queue 415. The submission queue 414 is configured to store request information or an instruction that is sent by the host 20 and that is received by the network interface device 411. The completion queue 415 is configured to store a completion command that is sent by the storage subsystem 35 and that is received by the network interface device 411. In this implementation, for implementation of functions of the submission queue 414 and the completion queue 415, refer to implementation of the functions of the submission queue and the completion queue in the memory 34 shown in FIG. 3. Implementation details are not described herein again.

In this implementation, a type of an access manner in which the host 20 accesses the storage device 40 is the same as a type of an access manner in which the host 20 accesses the storage device 30, and includes a data write access manner, a data read access manner, and an administrative command access manner. In the data write access manner, a method for sending a destination address and data to the interface card 41 of the storage device 40 by the host 20 in an RDMA manner is the same as an implementation in which the host 20 sends a destination address and data to the interface card 31 of the storage device 30 in an RDMA manner. Details are not described herein again. In addition, a sending manner of sending data, information, or an instruction to the interface card 41 of the storage device 40 by the host 20 is the same as a sending manner of sending information or an instruction to the interface card 31 of the storage device 30 by the host 20. Details are not described herein again.

In addition, in another implementation, if the cache 413 is a part of the memory 34, when the microprocessor 412 communicates with the cache 413, the microprocessor 412 needs to access the cache 413 in the memory 34 using the cache control unit in the processor 32. The cache control unit in the processor 32 may alternatively be outside the processor 32. For an implementation of the cache control unit connected to the processor 32, refer to implementation details of the cache control unit in the processor 32 described based on FIG. 3. An implementation is not described herein again.

Figure 5A:
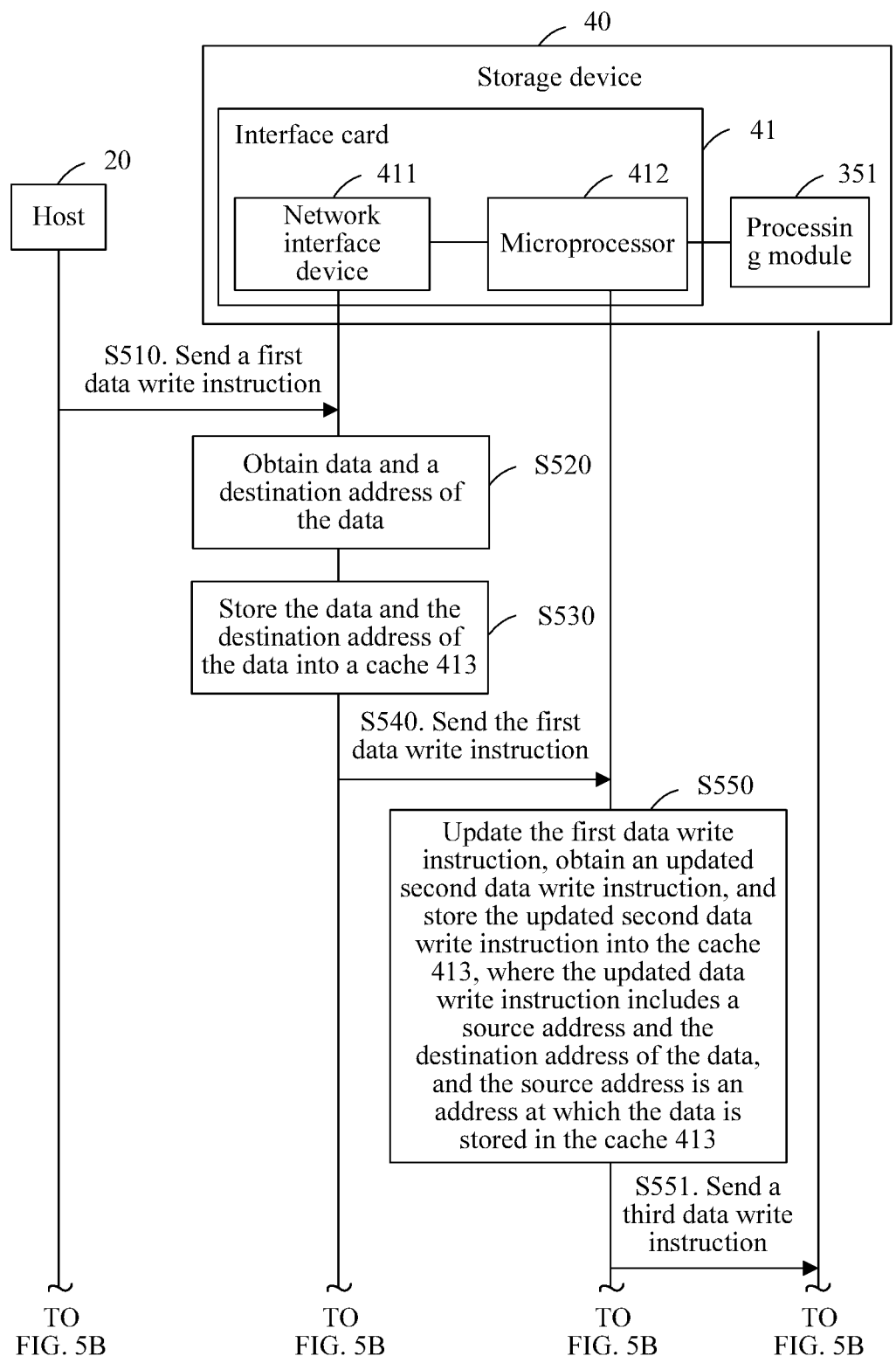
FIG. 5A and FIG. 5B are flowcharts of a data access method according to an embodiment of the present disclosure.
Figure 5B:
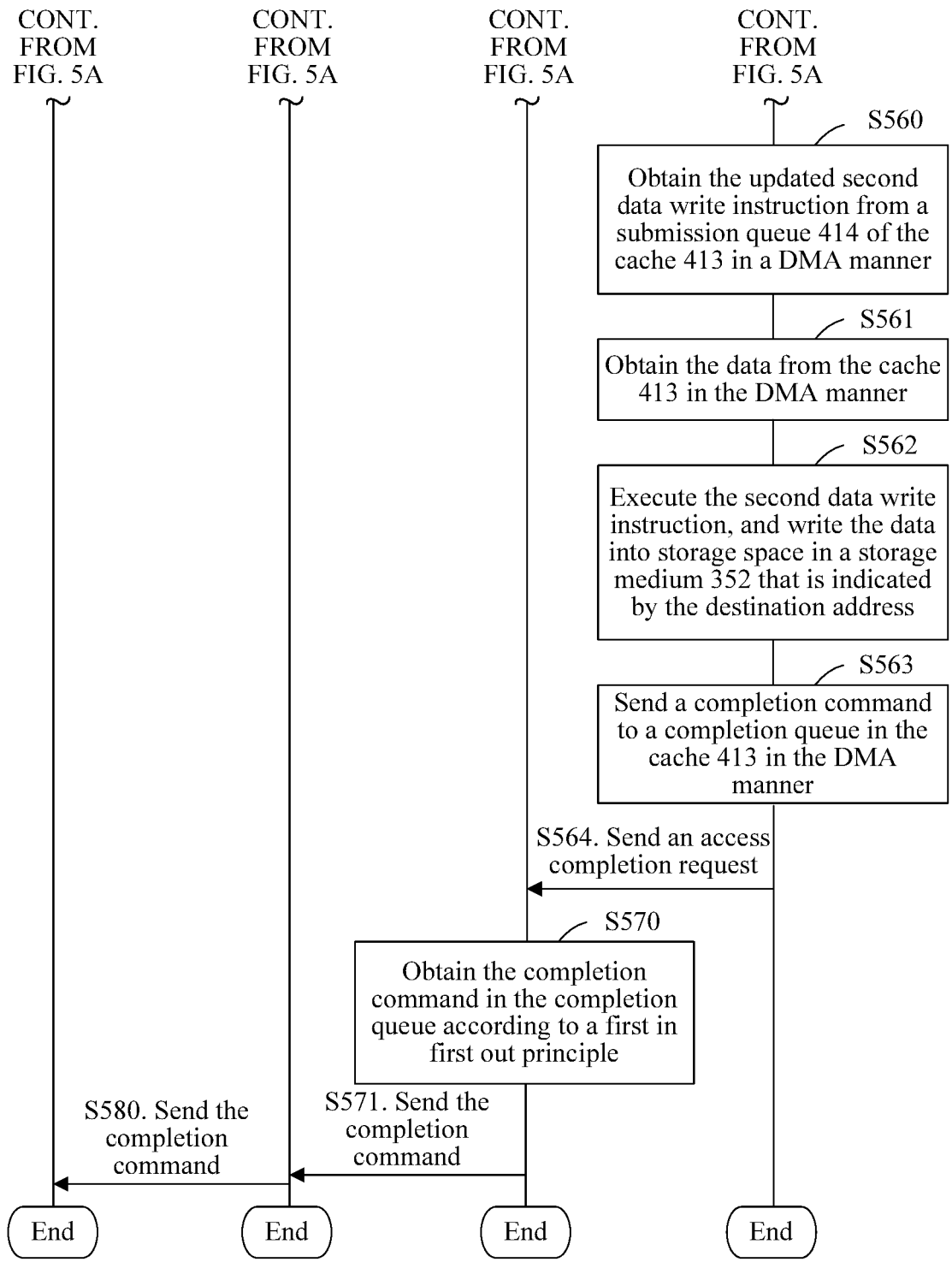

However, it should be noted that, in the data write access manner, the data read access manner, and the administrative command access manner in this implementation, a processing method after the interface card 41 of the storage device 40 receives the data, the information, or the instruction that is sent by the host 20 is different from a processing manner of the storage device 30. Another data access method according to an embodiment of the present disclosure is described in detail with reference to the storage system shown in FIG. 1, the host 20 shown in FIG. 2, the storage device 40 shown in FIG. 4A, and the interface card 41 shown in FIG. 4B. Referring to FIG. 5A and FIG. 5B, FIG. 5A and FIG. 5B are flowcharts of a data access method according to an embodiment of the present disclosure. As shown in FIG. 5A and FIG. 5B, this embodiment provides an access method for accessing the storage subsystem 35 by the host 20 in a data write access manner. In this implementation, step S510 is performed by the processor 22 of the host 20, steps S520, S530, S540, and S580 are performed by the network interface device 411 of the interface card 41, steps S550, S551, S570, and S571 are separately implemented by the microprocessor 412 of the interface card 41, and steps S560 to S564 are separately implemented by the processing module 351 of the storage subsystem 35. The data access method provided in this implementation further includes the following steps.

S510. The host 20 sends a first data write instruction to the interface card 41 of the storage device 40. The first data write instruction includes a destination address of data.

S520. The network interface device 411 of the interface card 41 obtains data and a destination address of the data. The network interface device 411 of the interface card 41 may obtain the data and the destination address of the data using the first data write instruction, or may obtain the data and the destination address of the data in an RDMA manner. When the network interface device 411 of the interface card 41 obtains the destination address of the data in the RDMA manner, the first data write instruction includes the destination address of the data, and the first data write instruction is in an RDMA write access request. For implementation details, refer to an implementation that is shown in FIG. 3 and in which the host 20 sends data and a destination address of the data. For details of an implementation in which the host 20 sends the data and the destination address of the data to the storage device 40 in the RDMA manner, refer to implementation details of a plurality of implementations in which the host 20 sends data to the interface card 31 of the storage device 30 in an RDMA manner in a data write access manner in which the host 20 accesses the storage device 30 in the embodiment of the storage device 30 shown in FIG. 3. An implementation is not described herein again.

In another implementation, if the host 20 does not send the data and the destination address of the data to the interface card 41 of the storage device 40 in the RDMA manner, the host 20 may send both the data and the destination address of the data to the interface card 41 of the storage device 40 by sending the first data write instruction. The first data write instruction includes the data and the destination address of the data.

S530. The network interface device 411 stores the data and the destination address of the data in the cache 413. Based on the interface card 41 shown in FIG. 4A and FIG. 4B, the network interface device 411 stores the data and the destination address of the data in the cache 413 of the interface card 41. The network interface device 411 sends the data to the cache control unit in the interface card 41, and the cache control unit in the interface card 41 stores the data in the cache 413. If the first data write instruction includes the destination address of the data, the network interface device 411 sends the destination address of the data to the microprocessor 412, and the microprocessor 412 of the interface card 41 stores the destination address of the data in the cache 413. The data may be sent to the network interface device 411 of the interface card 41 in the RDMA manner, and the network interface device 411 stores the data in the cache 413.

If both the data and the destination address of the data are in the first data write instruction, the network interface device 411 sends the first data write instruction including the data and the destination address of the data to the microprocessor 412. The microprocessor 412 obtains the data and the destination address of the data after parsing the first data write instruction, and the microprocessor 412 of the interface card 41 stores the data in the cache 413. Alternatively, after parsing the first data write instruction, the network interface device 411 may store, in the cache 413, the data obtained after the first data write instruction is parsed, and send, to the microprocessor 412, the destination address of the data obtained after parsing is performed. The microprocessor 412 stores the destination address of the data in the cache 413.

The cache control unit may be in the interface card 41, may be in the microprocessor 412, or may be outside the microprocessor 412 and connected to the microprocessor 412. The interface card 41 stores data or information in the cache 413 using the cache control unit. If the network interface device 411 sends data or information to the cache 413, the network interface device 411 sends the data or the information to the cache control unit of the storage device 40, and the cache control unit of the storage device 40 stores the data or the information in the cache 413. If the microprocessor 412 sends data or information to the cache 413, the microprocessor 412 sends the data or the information to the cache control unit of the storage device 40, and the cache control unit of the storage device 40 stores the data or the information in the cache 413.

In this implementation, the cache 413 is in the interface card 41, and the cache 413 of the interface card 41 stores the data, the destination address of the data, and a second data write instruction, in order to save a system memory resource of the storage device 40, and reduce a transmission delay.

S540. After receiving the first data write instruction, the network interface device 411 of the interface card 41 sends the first data write instruction to the microprocessor 412. The first data write instruction includes the destination address of the data.

S550. After receiving the first data write instruction, the microprocessor 412 updates the first data write instruction, obtains an updated second data write instruction, and stores the updated second data write instruction in the cache 413 of the interface card 41. Further, after updating the first data write instruction, the microprocessor 412 generates the second data write instruction. The updated second data write instruction includes a source address and the destination address of the data, and the source address is an address at which the data is stored in the cache 413. Then, the microprocessor 412 stores the updated second data write instruction in the submission queue 414 of the cache 413 using the cache control unit of the interface card 41. In the interface card 41, the cache control unit of the interface card 41 is connected to the cache 413 using a memory bus, and the cache control unit is in the microprocessor 412 or outside the microprocessor 412.

In another implementation, if the cache 413 is a part of the memory 34, after the microprocessor receives the first data write instruction, the microprocessor 412 updates the first data write instruction, obtains a second data write instruction, and stores the second data write instruction in the cache 413 of the memory 34. Further, the microprocessor 412 stores the updated second data write instruction in the submission queue 414 in the cache 413 of the memory 34 using the cache control unit in the processor 32 or the cache control unit that is outside the processor 32 and that is connected to the memory 34 using a memory bus.

S551. The microprocessor 412 of the interface card 41 sends a third data write instruction to the processing module 351. Sending of the third data write instruction to the processing module 351 aims to instruct the processing module 351 to obtain the updated second data write instruction in a DMA manner. The sent third data write instruction may be an address at which the updated second data write instruction is stored in the cache 413. If the updated second data write instruction is stored in the cache 413 in a form of a linked list, the third data write instruction sent by the microprocessor 412 may include a head address at which the updated second data write instruction is stored in the cache 413, that is, a head address of the linked list. Further, the microprocessor 412 sends the address at which the updated second data write instruction is stored in the cache 413 to a register of the processing module 351, to instruct the processing module 351 to obtain, in the DMA manner according to the address at which the updated second data write instruction is stored in the cache 413, the stored updated second data write instruction from storage space to which the address at which the updated second data write instruction is stored in the cache 413 points.

S560. The processing module 351 obtains the updated second data write instruction from the submission queue 414 of the cache 413 in a DMA manner. Further, an implementation in which the processing module 351 obtains the updated second data write instruction from the submission queue 414 of the cache 413 in the DMA manner is as follows. The processing module 351 obtains, in the DMA manner according to the address at which the updated second data write instruction is stored in the cache 413, the second data write instruction stored in the storage space to which the address at which the updated second data write instruction is stored in the cache 413 points.

In this implementation, the processing module 351 sends a first obtaining instruction to the cache control unit of the interface card 41 using a communications bus. The first obtaining instruction includes the address of the updated second data write instruction in the cache 413. After receiving the first obtaining instruction, the cache control unit of the interface card 41 sends, to the processing module 351, the updated second data write instruction stored in the submission queue of the cache 413. The cache control unit of the interface card 41 may be in the microprocessor 412, or may be connected to the microprocessor 412.

In another implementation, if the cache 413 is a part of the memory 34, the processing module 351 sends a first obtaining instruction to the cache control unit of the processor 32 using a communications bus. The cache control unit may be outside the processor 32 and connected to the processor 32. The first obtaining instruction includes the address of the updated second data write instruction in the cache 413. After receiving the first obtaining instruction, the cache control unit sends, to the processing module 351, the updated second data write instruction stored in the submission queue of the cache 413.

In this implementation, the second data write instruction is sent to the storage subsystem 35 in the direct memory access DMA manner, in order to improve efficiency of accessing the storage subsystem 35 in the storage device 40. The third data write instruction in step S551 is sent by the interface card 41 to the storage subsystem 35, and no resource of the processor 32 of the storage device 40 is used. When the host 20 needs to frequently perform data access to the storage subsystem 35 of the storage device 40, the interface card 41 sends the third data write instruction in the present disclosure, such that no processing resource of the processor 32 of the storage device 40 is consumed, a processing rate for processing another event by the processor 32 of the storage device 40 is improved, and a rate for accessing the storage subsystem 35 of the storage device 40 by the host 20 is improved.

S561. The processing module 351 obtains the data from the cache 413 in the DMA manner. After the processing module 351 obtains the updated second data write instruction, the processing module 351 obtains the data from the cache 413 according to the source address of the data in the second data write instruction in the DMA manner. Further, the processing module 351 takes over the communications bus 33 from the processor 32, and controls the communications bus 33 to transmit, to the processing module 351, the data in storage space to which the source address in the cache 413 points.

In this implementation, the processing module 351 sends a second obtaining instruction to the cache control unit of the interface card 41 using the communications bus. The second obtaining instruction includes the source address in the updated second data write instruction. After receiving the second obtaining instruction, the cache control unit of the interface card 41 sends, to the processing module 351, the data stored in the storage space in the cache 413 to which the source address points.

In another implementation, if the cache 413 is a part of the memory 34, the processing module 351 sends a second obtaining instruction to the cache control unit of the processor 32 using the communications bus. The cache control unit may be outside the processor 32 and connected to the processor 32. The second obtaining instruction includes the source address in the updated second data write instruction. After receiving the second obtaining instruction, the cache control unit sends, to the processing module 351, the data stored in the storage space in the cache 413 to which the source address points.

S562. The processing module 351 executes the second data write instruction, and writes the data into storage space in the storage medium 352 that is corresponding to the destination address. Further, for an implementation in which the processing module 351 executes the write instruction and writes the data into the storage space in the storage medium 352 that is corresponding to the destination address, refer to details of an implementation in which the processing module 351 writes the data into storage space in the storage medium 352 that is corresponding to the destination address in the data write access manner in which the host 20 accesses the storage device 30 in the embodiment of the storage device 30 shown in FIG. 3. An implementation is not described herein again.

S563. The processing module 351 sends a completion command to a completion queue in the cache 413 in the DMA manner.

S564. The processing module 351 sends a completion request to the microprocessor 412.

S570. After receiving the completion request, the microprocessor 412 obtains the completion command in the completion queue 415 according to a first in first out principle.

S571. The microprocessor 412 sends the completion command to the network interface device 411.

S580. The network interface device 411 sends the completion command to the host 20.

In the method for accessing the storage device 40 in the data write access manner described in FIG. 5A and FIG. 5B, after the interface card 41 receives the first data write instruction, the interface card 41 generates the second data write instruction, and writes the second data write instruction into the cache 413. No resource of the processor 32 of the storage device 40 is used. The cache control unit in the microprocessor 412 of the interface card 41 sends the second data write instruction to the storage subsystem 35 to instruct the storage subsystem 35 to execute the second data write instruction. When the host 20 needs to frequently perform data access to the storage subsystem 35 of the storage device 40, according to the method provided in this embodiment, no processing resource of the processor 32 of the storage device 40 is consumed, the processing rate for processing another event by the processor 32 of the storage device 40 is improved, and the rate for accessing the storage subsystem 35 of the storage device 40 by the host 20 is improved.

Based on the data access method implemented in FIG. 5A and FIG. 5B, in addition to the source address of the data and the destination address of the data, the updated second data write instruction further includes description information of the data, and the description information of the data includes description information such as a length of the data, an access type of the data, and an access priority of the data. For a manner of sending the description information of the data by the host 20, refer to details of an implementation in which the host 20 sends description information of the data in the data write access manner in which the host 20 accesses the storage device 30 in the embodiment of the storage device 30 shown in FIG. 3. An implementation is not described herein again. It should be noted that all or a part of the description information of the data may be included in the first data write instruction. The host 20 sends the description information of the data by sending the first data write instruction. After receiving the first data write instruction using the microprocessor 412, the storage device 40 updates the first data write instruction. In another implementation, the host 20 may send RDMA write access information including the description information of the data to the interface card 41 in the RDMA manner. After receiving the description information of the data, the network interface device 411 of the interface card 41 directly stores the description information of the data in the cache 413. All information in the description information of the data, the data, and the destination address of the data may be encapsulated in one piece of RDMA write access information, or a part or all of the description information of the data may be encapsulated in a plurality of pieces of RDMA write access information. Alternatively, a part of the description information of the data may be included in the first data write instruction and sent to the storage device 40. A specific manner of sending the description information of the data is not limited in this embodiment. If the description information of the data is sent in the RDMA manner, the description information of the data needs to be sent to the interface card 41 before the first data write instruction is sent, in order to store the description information of the data in the cache 413.

Figure 6A:
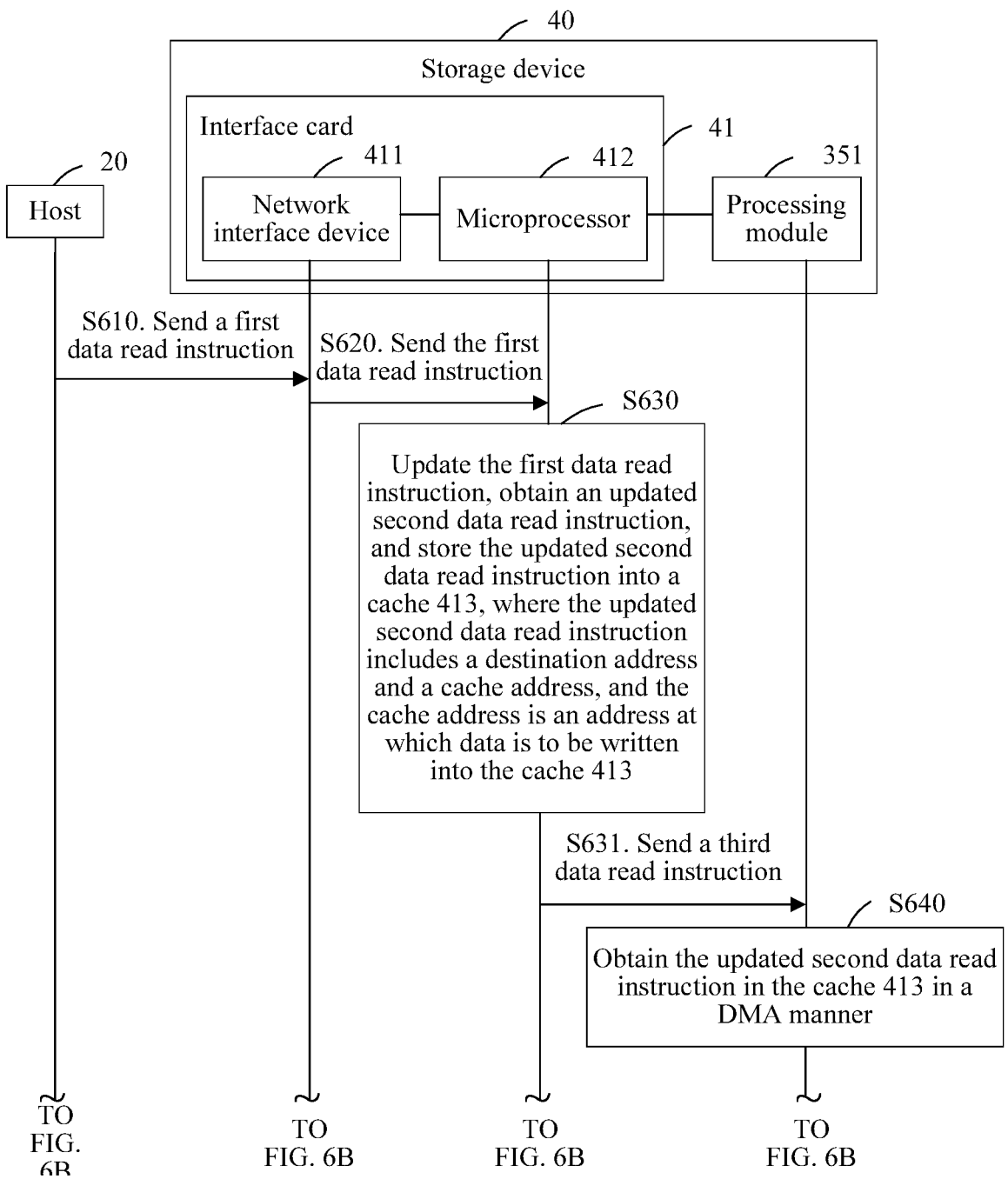
FIG. 6A and FIG. 6B are flowcharts of another data access method according to an embodiment of the present disclosure.
Figure 6B:
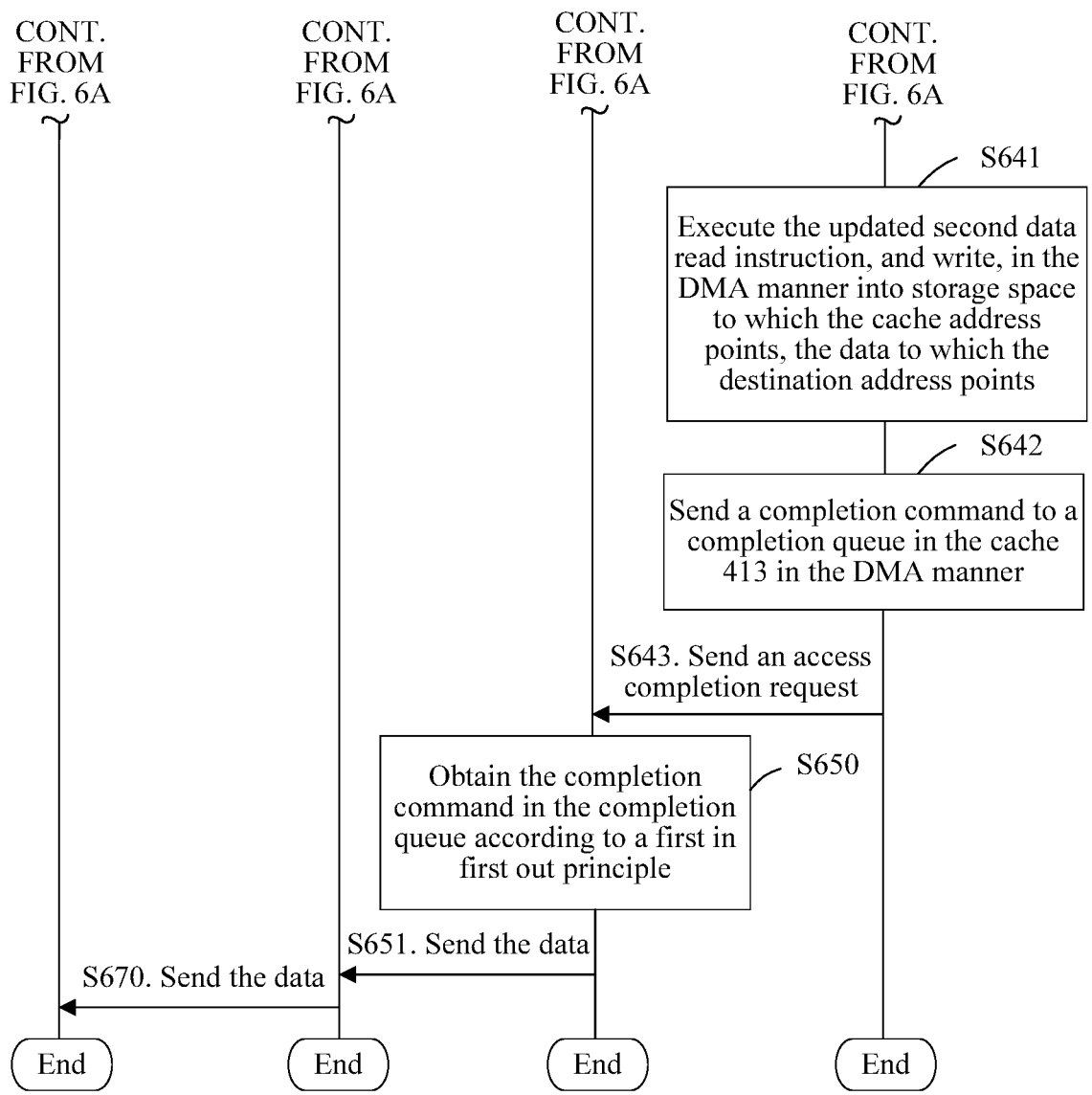

Referring to FIG. 6A and FIG. 6B, FIG. 6A and FIG. 6B are flowcharts of another data access method according to an embodiment of the present disclosure. As shown in FIG. 6A and FIG. 6B, this embodiment provides an access method for accessing the storage subsystem 35 by the host 20 in a data read access manner, and an access manner of reading, by the host 20 after data is written into the storage subsystem 35 of the storage device 40 in the implementation shown in FIG. 5A and FIG. 5B, the data stored in the storage subsystem 35 is mainly described. In this implementation, step S610 is performed by the processor 22 of the host 20, steps S620 and S670 are separately implemented by the network interface device 411 of the interface card 41 of the storage device 40, steps S630, S631, S650, and step S651 are separately implemented by the microprocessor 412 of the interface card 41 of the storage device 40, and steps S640 to S643 are separately implemented by the processing module 351 of the storage device 40. The data access method provided in this implementation further includes the following steps.

S610. The host 20 sends a first data read instruction to the interface card 41 of the storage device 40, where the first data read instruction includes a destination address, and the destination address is used to indicate an address at which data is written into the storage subsystem 35. For a manner of sending the first data read instruction by the host 20, refer to details of an implementation in which the host 20 sends a data read instruction in a data read access manner in which the host 20 accesses the storage device 30 in the embodiment of the storage device 30 shown in FIG. 3. An implementation is not described herein again.

S620. After receiving the first data read instruction, the network interface device 411 of the interface card 41 sends the first data read instruction to the microprocessor 412 of the interface card 41.

S630. The microprocessor 412 of the interface card 41 updates the first data read instruction, obtains an updated second data read instruction, and stores the updated second data read instruction in the cache 413 of the interface card 41. Further, after updating the first data read instruction, the microprocessor 412 generates the second data read instruction. The updated second data read instruction includes the destination address and a cache address, and the cache address is an address at which the data is to be written into the cache 413. Then, the microprocessor 412 stores the updated second data read instruction in the submission queue 414 of the cache 413 using the cache control unit of the interface card 41. In the interface card 41, the cache control unit of the interface card 41 is connected to the cache 413 using a memory bus, and the cache control unit is in the microprocessor 412 or outside the microprocessor 412.

In another implementation, if the cache 413 is a part of the memory 34, after receiving the first data read instruction, the microprocessor 412 updates the first data read instruction, obtains a second data read instruction, and stores the second data read instruction in the cache 413 of the memory 34. Further, the microprocessor 412 stores the updated second data read instruction in the submission queue 414 in the cache 413 of the memory 34 using the cache control unit in the processor 32 or the cache control unit that is outside the processor 32 and that is connected to the memory 34 using a memory bus.

S631. The microprocessor 412 of the interface card 41 sends a third data read instruction to the processing module 351. Sending of the third data read instruction to the processing module 351 aims to instruct the processing module 351 to obtain the updated second data read instruction in a DMA manner. The sent third data read instruction may be an address at which the updated second data read instruction is stored in the cache 413. If the updated second data read instruction is stored in the cache 413 in a form of a linked list, the third data read instruction sent by the microprocessor 412 may be a head address at which the updated second data read instruction is stored in the cache 413, that is, a head address of the linked list. Further, the microprocessor 412 sends the address at which the updated second data read instruction is stored in the cache 413 to a register of the processing module 351, to instruct the processing module 351 to obtain, in the DMA manner according to the address at which the updated second data read instruction is stored in the cache 413, the stored updated second data read instruction from storage space to which the address at which the updated second data read instruction is stored in the cache 413 points.

S640. The processing module 351 obtains the updated second data read instruction in the cache 413 in a DMA manner. The second data read instruction stored in the storage space to which the address at which the updated second data read instruction is stored in the cache 413 points is obtained according to the address at which the updated second data read instruction is stored in the cache 413.

In this implementation, the processing module 351 sends a third obtaining instruction to the cache control unit of the interface card 41 using a communications bus. The third obtaining instruction includes the address of the updated second data read instruction in the cache 413. After receiving the third obtaining instruction, the cache control unit of the interface card 41 sends, to the processing module 351, the updated second data read instruction stored in the submission queue of the cache 413.

In another implementation, if the cache 413 is a part of the memory 34, the processing module 351 sends a third obtaining instruction to the cache control unit of the processor 32 using a communications bus. The cache control unit may be outside the processor 32 and connected to the processor 32. The third obtaining instruction includes the address of the updated second data read instruction in the cache 413. After receiving the third obtaining instruction, the cache control unit sends, to the processing module 351, the updated second data read instruction stored in the submission queue of the cache 413.

In this implementation, the second data read instruction is sent to the storage subsystem 35 in the direct memory access DMA manner, in order to improve efficiency of accessing the storage subsystem 35 in the storage device 40. The third data read instruction in step S631 is generated by the microprocessor 412 of the interface card 41 and sent to the storage subsystem 35, and no resource of the processor 32 of the storage device 40 is used. When the host 20 needs to frequently perform data access to the storage subsystem 35 of the storage device 40, the interface card 41 sends the third data read instruction in this embodiment, such that no processing resource of the processor 32 of the storage device 40 is consumed, a processing rate for processing another event by the processor 32 of the storage device 40 is improved, and a rate for accessing the storage subsystem 35 of the storage device 40 by the host 20 is improved.

S641. The processing module 351 executes the updated second data read instruction, and writes, in the DMA manner into storage space to which a cache address points, the data to which the destination address points.

Further, the processing module 351 sends a DMA write request to the cache control unit using the communications bus. The DMA write request includes the data and the cache address. After receiving the DMA write request, the cache control unit writes the data into the storage space to which the cache address points.

In another implementation, if the cache 413 is a part of the memory 34, the processing module 351 sends a DMA write request to the cache control unit of the processor 32 using the communications bus. The cache control unit may be outside the processor 32 and connected to the processor 32. The DMA write request includes the data and the cache address. After receiving the DMA write request, the cache control unit writes the data into the storage space to which the cache address points.

S642. The processing module 351 sends a completion command to a completion queue in the cache 413 in the DMA manner.

S643. The processing module 351 sends a completion request to the microprocessor 412.

S650. After receiving the completion request, the microprocessor 412 obtains the completion command in the completion queue 415 according to a first in first out principle.

S651. The microprocessor 412 sends the data to the network interface device 411 in an RDMA manner. For an implementation in which the microprocessor 412 sends the data to the network interface device 411 in the RDMA manner, refer to details of an implementation in which the processor 32 sends data to the interface card 31 in two manners, and the interface card 31 sends the data to the host 20 in the data read access manner in which the host 20 accesses the storage device 30 in the embodiment of the storage device 30 shown in FIG. 3. An implementation is not described herein again. Different from the data read access manner in which the host 20 accesses the storage device 30 in the embodiment of the storage device 30 shown in FIG. 3, the microprocessor 412 sends the data to the network interface device 411 in this implementation.

S660. The network interface device 411 sends the data to the host 20 in the RDMA manner. For an implementation in which the network interface device sends the data to the host 20 in the RDMA manner, refer to details of an implementation in which the interface card 31 sends the data to the host 20 in two manners in the data read access manner in which the host 20 accesses the storage device 30 in the embodiment of the storage device 30 shown in FIG. 3. An implementation is not described herein again.

In the method that is for accessing the storage device 40 in the data read access manner and shown in FIG. 6A and FIG. 6B, after the interface card 41 receives the first data read instruction, the interface card 41 generates the second data read instruction, and writes the second data read instruction into the cache 413. No resource of the processor 32 of the storage device 40 is used. The cache control unit in the microprocessor 412 of the interface card 41 sends the second data read instruction to the storage subsystem 35 to instruct the storage subsystem 35 to execute the second data read instruction. When the host 20 needs to frequently perform data access to the storage subsystem 35 of the storage device 40, according to the data read access method provided in this embodiment, no processing resource of the processor 32 of the storage device 40 is consumed, the processing rate for processing another event by the processor 32 of the storage device 40 is improved, and the rate for accessing the storage subsystem 35 of the storage device 40 by the host 20 is improved.

The embodiments of the present disclosure further provide another data access manner that is further an administrative command access manner. Different from the data read access manner shown in FIG. 6A and FIG. 6B, in a data access method corresponding to the administrative command access manner, a sent first data read instruction does not include a destination address of data. After the first data read instruction is updated, a generated second data read instruction does not include the destination address of the data either. After obtaining the updated second data read instruction, the processing module 351 executes the updated second data read instruction, and sends, to the cache 413, the data generated after the second data read instruction is updated. In this implementation, details of an implementation of the data access method corresponding to the administrative command access manner are the same as those of an implementation of the method in the data read access manner. For this, refer to the details of the data read access manner shown in FIG. 6A and FIG. 6B. Details are not described herein again.

Figure 7:
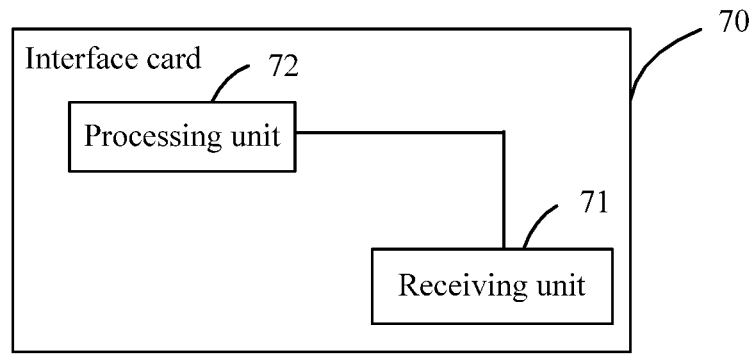
FIG. 7 is a structural diagram of another interface card according to an embodiment of the present disclosure.

Referring to FIG. 7, FIG. 7 is a structural diagram of another interface card according to an embodiment of the present disclosure. The interface card provided in this embodiment is applied to a storage device. The storage device 40 further includes a cache control unit, a cache 413, and a storage subsystem 35. As shown in FIG. 7, the interface card 70 provided in this embodiment includes a receiving unit 71 and a processing unit 72. The receiving unit 71 is connected to the processing unit 72.

The receiving unit 71 is configured to receive a first data write instruction sent by a host.

In this implementation, a function that the receiving unit 71 receives the first data write instruction sent by the host may be implemented by a network interface device 411 in the storage device 40. For implementation details of the first data write instruction, refer to details of step S510 shown in FIG. 5A and FIG. 5B. Details are not described herein again.

The processing unit 72 is configured to: obtain data and a destination address of the data; write the data and the destination address into the cache 413; generate a second data write instruction; and write the second data write instruction into the cache 413. The destination address is used to indicate an address at which the data is to be written into the storage subsystem 35. The second data write instruction includes a source address and the destination address, and the source address is an address at which the data is stored in the cache 413.

In this implementation, a function that the processing unit 72 obtains the data may be implemented by the network interface device 411 in the storage device 40, and a function that the processing unit 72 obtains the destination address of the data may be implemented by a microprocessor 412 in the storage device 40. For details of an implementation in which the processing unit 72 obtains the data and the destination address of the data, refer to details of step S520 shown in FIG. 5A and FIG. 5B. Details are not described herein again.

In this implementation, a function that the processing unit 72 stores the data into the cache 413 may be implemented by the cache control unit, and when the cache control unit is in the microprocessor 412, the function is implemented by the microprocessor 412. In addition, a function that the processing unit 72 stores the destination address into the cache 413 may be implemented by the microprocessor 412 in an interface card 41 in the storage device 40. For details of an implementation in which the processing unit 72 writes the data into the cache 413 and writes the destination address into the cache 413, refer to details of steps S530 and S540 shown in FIG. 5A and FIG. 5B. Details are not described herein again.

In this implementation, a function that the processing unit 72 generates the second data write instruction and writes the second data write instruction into the cache 413 may be implemented by the microprocessor 412 in the interface card 41 in the storage device 40. For details of an implementation in which the processing unit 72 generates the second data write instruction and writes the second data write instruction into the cache 413, refer to details of step S550 shown in FIG. 5A and FIG. 5B. Details are not described herein again.

The second data write instruction is used to instruct the storage subsystem 35 to read the data from the cache 413 according to the source address, and write the data into storage space corresponding to the destination address. The second data write instruction in the cache 413 is sent by the cache control unit to the storage subsystem 35. The cache control unit is connected to the cache 413. The cache control unit is outside the interface card 41 or in the interface card 41. When the cache control unit is in the interface card 41, the cache control unit may be in the microprocessor 412 or connected to the microprocessor 412. For details of an implementation in which the cache control unit sends the second data write instruction in the cache 413 to the storage subsystem 35, refer to steps S551 and S560 shown in FIG. 5A and FIG. 5B. Implementation details are not described herein again.

The storage subsystem 35 reads the data from the cache 413 according to the source address, and writes the data into the storage space corresponding to the destination address. The storage subsystem 35 is implemented by a solid state disk, the storage subsystem 35 reads the data from the cache 413 according to the source address, and a function that the storage subsystem 35 writes the data into the storage space corresponding to the destination address is implemented by a processing module 351 in the solid state disk. For implementation details, refer to details of steps S561 and S562 shown in FIG. 5A and FIG. 5B. Details are not described herein again.

Figure 8:
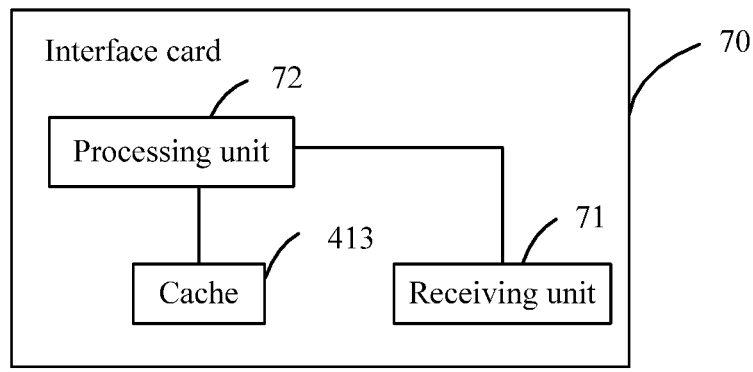
FIG. 8 is a structural diagram of another interface card according to an embodiment of the present disclosure.

Based on the interface card 70 shown in FIG. 7, referring to FIG. 8, FIG. 8 is a structural diagram of another interface card 70 according to an embodiment of the present disclosure. As shown in FIG. 8, the cache 413 is in the interface card 70 and is connected to the processing unit 72. The cache control unit is in the interface card 70. In this implementation, the cache control unit may be integrated into the processing unit 72, or may be outside the processing unit 72.

Figure 9:
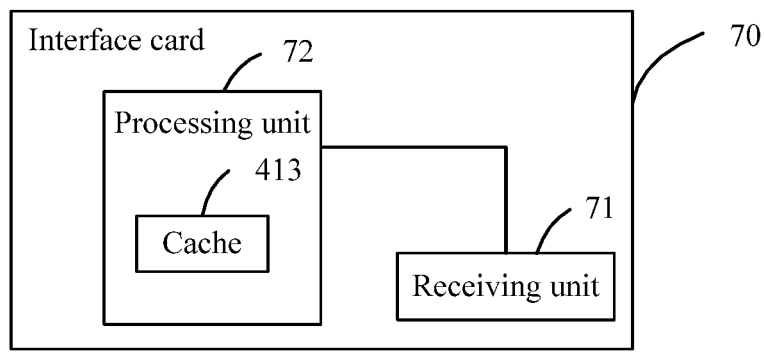
FIG. 9 is a structural diagram of another interface card according to an embodiment of the present disclosure.

Based on the interface card 70 shown in FIG. 7, referring to FIG. 9, FIG. 9 is a structural diagram of another interface card 70 according to an embodiment of the present disclosure. As shown in FIG. 9, the cache 413 is in the processing unit 72, and the cache control unit is in the interface card 70. In this implementation, the cache control unit may be integrated into the processing unit 72, or may be outside the processing unit 72.

Figure 10:
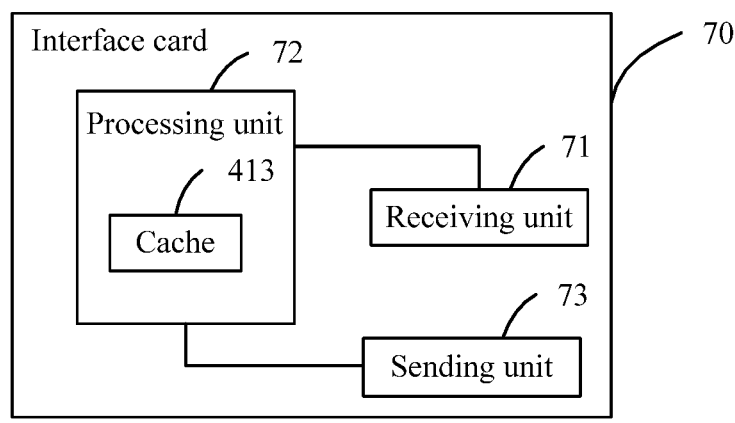
FIG. 10 is a structural diagram of another interface card according to an embodiment of the present disclosure.

Based on the interface card 70 shown in FIG. 9, referring to FIG. 10, FIG. 10 is a structural diagram of another interface card 70 according to an embodiment of the present disclosure. As shown in FIG. 10, the interface card 70 further includes a sending unit 73, and the sending unit 73 is connected to the processing unit 72. The processing unit 72 is further configured to: generate a third data write instruction after generating the second data write instruction; and send the third data write instruction to the sending unit 73. The third data write instruction is used to instruct the storage subsystem 35 to obtain the second data write instruction from the cache 413 in a direct memory access manner. The sending unit 73 is configured to send the third data write instruction to the storage subsystem 35. After the processing unit 72 generates the second data write instruction, a function that the processing unit 72 generates the third data write instruction is implemented by the microprocessor 412 in the interface card 41 of the storage device 40. For implementation details, refer to details of step S551 shown in FIG. 5A and FIG. 5B. Details are not described herein again. A function that the sending unit 73 sends the third data write instruction to the storage subsystem 35 is implemented by the microprocessor 412 in the interface card 41 of the storage device 40. For implementation details, refer to details of step S551 shown in FIG. 5A and FIG. 5B. Details are not described herein again. In another implementation, the sending unit 73 and the processing unit 72 may be integrated together or implemented using two apparatuses. An implementation is not limited in this embodiment.

In an optional implementation, all or some of the sending unit 73, the processing unit 72, and the receiving unit 71 may be in the microprocessor 412.

In an optional implementation, the cache 413 includes at least one submission queue, and the processing unit 72 is further configured to write the second data write instruction into the submission queue. For implementation details of the cache 413, refer to implementation details of the cache 413 in the interface card 41 shown in FIG. 4A and FIG. 4B or a description of an optional implementation scheme. Details are not described herein again.

In an optional implementation, the receiving unit 71 is further configured to receive a first data read instruction sent by the host. The first data read instruction includes a destination address. In this implementation, a function that the receiving unit 71 receives the first data read instruction sent by the host may be implemented by the network interface device 411 in the storage device 40. For implementation details of the first data read instruction, refer to details of step S610 shown in FIG. 6A and FIG. 6B. Details are not described herein again.

The processing unit 72 is further configured to: generate a second data read instruction; and write the second data read instruction into the cache 413. The second data read instruction includes the destination address and a cache address, and the cache address is an address at which the data is to be written into the cache 413 from the storage subsystem 35. In this implementation, a function that the processing unit 72 generates the second data read instruction and writes the second data read instruction into the cache 413 may be implemented by the microprocessor 412 of the interface card 41 in the storage device 40. For implementation details of the second data read instruction, refer to details of steps S620 and S630 shown in FIG. 6A and FIG. 6B. Details are not described herein again.

The second data read instruction in the cache 413 is sent by the cache control unit to the storage subsystem 35. For details of an implementation in which the cache control unit sends the second data read instruction in the cache 413 to the storage subsystem 35, refer to steps S631 and S640 shown in FIG. 6A and FIG. 6B. Implementation details are not described herein again. The second data read instruction is used to instruct the storage subsystem 35 to read the data from the storage space corresponding to the destination address, and write the data into the cache 413 according to the cache address. The storage subsystem 35 reads the data from the storage space corresponding to the destination address, and writes the data into the cache 413 according to the cache address. In this implementation, the storage subsystem 35 is implemented by a solid state disk, and a function that the storage subsystem 35 reads the data from the storage space corresponding to the destination address and writes the data into the cache 413 according to the cache address is implemented by the processing module 351 in the solid state disk. For implementation details, refer to details of step S641 shown in FIG. 6A and FIG. 6B. Details are not described herein again.

The processing unit 72 is further configured to: read the data from the cache 413; and send the data to the host 20.

In this implementation, a function that the processing unit 72 reads the data from the cache 413 and sends the data to the host is implemented by the microprocessor 412 in the interface card 41 of the storage device 40. For implementation details, refer to details of steps S643, S650, and S651 shown in FIG. 6A and FIG. 6B. Details are not described herein again.

In an optional implementation, the processing unit 72 is further configured to generate a third data read instruction. The third data read instruction is used to instruct the storage subsystem 35 to obtain the second data read instruction from the cache 413 in the direct memory access manner. In this implementation, a function that the processing unit 72 generates the third data read instruction is implemented by the microprocessor 412 in the interface card 41 of the storage device 40. For implementation details, refer to details of step S631 shown in FIG. 6A and FIG. 6B. Details are not described herein again.

The sending unit 73 is further configured to send the third data read instruction to the storage subsystem 35. In this implementation, a function that the sending unit 73 sends the third data read instruction to the storage subsystem 35 is implemented by the microprocessor 412 in the interface card 41 of the storage device 40. For implementation details, refer to details of step S631 shown in FIG. 6A and FIG. 6B. Details are not described herein again.

In an optional implementation, the receiving unit 71 is further configured to obtain the data from the first data write instruction. A function that the receiving unit 71 obtains the data from the first data write instruction is implemented by the network interface device 411 in the interface card 41 of the storage device 40. For implementation details, refer to implementation details of step S520 shown in FIG. 5A and FIG. 5B. Details are not described herein again. The processing unit 72 is further configured to obtain the data from the first data write instruction. The processing unit 72 is further configured to obtain the destination address from the first data write instruction. A function that the processing unit 71 obtains the data and the destination address of the data from the first data write instruction may be implemented by the microprocessor 412 of the interface card 41.

In an optional implementation, the receiving unit 71 is further configured to receive, in a remote direct memory manner, the data sent by the host. A function that the receiving unit 71 receives, in the remote direct memory manner, the data sent by the host 20 is implemented by the network interface device 411 in the interface card 41 of the storage device 40. For implementation details, refer to implementation details of step S520 shown in FIG. 5A and FIG. 5B. Details are not described herein again. The processing unit 72 is configured to receive, in the remote direct memory manner, the data and the destination address of the data that are sent by the host. A function that the processing unit 72 receives, in the remote direct memory manner, the data and the destination address of the data that are sent by the host may be implemented by the cache control unit. If the cache control unit is in the microprocessor 412, this function is implemented by the microprocessor 412.

In an optional implementation, the receiving unit 71 is further configured to obtain the destination address of the data from the first data write instruction. A function that the receiving unit 71 obtains the destination address of the data from the first data write instruction is implemented by the network interface device 411 in the interface card 41 of the storage device 40. For implementation details, refer to implementation details of step S520 shown in FIG. 5A and FIG. 5B. Details are not described herein again.

In an optional implementation, the receiving unit 71 is further configured to receive, in a remote direct memory manner, the destination address of the data sent by the host. A function that the receiving unit 71 receives, in the remote direct memory manner, the destination address of the data sent by the host 20 is implemented by the network interface device 411 in the interface card 41 of the storage device 40. For implementation details, refer to implementation details of step S520 shown in FIG. 5A and FIG. 5B. Details are not described herein again.

In another implementation, all or some of units constituting the interface card 70 may be in the interface card 70.

According to another aspect, an embodiment of the present disclosure further provides a computer readable storage medium. The computer readable storage medium stores an instruction. When run on a computer, the instruction causes the computer to perform the data access method in FIG. 5A and FIG. 5B or FIG. 6A and FIG. 6B or any possible implementations of a related data access method.

According to the data access method and the apparatus that are provided in the embodiments of the present disclosure, after the interface card receives the first data write instruction or the first data read instruction, the interface card generates the second data write instruction or the second data read instruction, and writes the second data write instruction or the second data read instruction into the cache. No resource of the processor of the storage device is used. The cache control unit sends the second data write instruction or the second data read instruction to the storage subsystem, and no resource of the processor of the storage device is used. Alternatively, the cache control unit may instruct the storage subsystem to execute the second data write instruction or the second data read instruction. When the host needs to frequently perform data access to the storage subsystem of the storage device, according to the data access method and the apparatus that are provided in the present disclosure, no processing resource of the processor of the storage device is consumed, the processing rate for processing another event by the processor of the storage device is improved, and the rate for accessing the storage subsystem of the storage device by the host is improved.

An ordinary person skilled in the art may understand that the foregoing storage medium includes any non-transitory machine-readable medium capable of storing program code, such as a USB flash drive, a removable hard disk, a magnetic disk, an optical disc, a RAM, a SSD, or a non-volatile memory.

Finally, it should be noted that the foregoing embodiments are merely intended for describing the technical solutions of the present disclosure, rather than limiting the present disclosure.

What is claimed is:

1. A data access method applied to a storage device comprising a cache control unit, an interface card, a cache, a processor, and a storage subsystem, the method comprising:
   receiving, by the interface card, a first data write instruction from a host;
   obtaining, by the interface card, data and a destination address of the data, wherein the destination address indicates an address at which the data is to be written into the storage subsystem;
   writing, by the interface card, the data and the destination address into the cache without consuming any resources of the processor;
   generating, by the interface card, a second data write instruction, wherein the second data write instruction comprises a source address and the destination address, and wherein the source address is an address at which the data is stored in the cache;
   sending, by the cache control unit, the second data write instruction to the storage subsystem without consuming any resources of the processor;
   reading, by the storage subsystem, the data from the cache according to the source address;
   writing the data into storage space corresponding to the destination address;
   receiving, by the interface card, a first data read instruction from the host, wherein the first data read instruction comprises the destination address;
   generating, by the interface card, a second data read instruction; and
   writing the second data read instruction into the cache, wherein the second data read instruction comprises the destination address and a cache address at which the data is to be written into the cache from the storage subsystem.

2. The method according to claim 1, further comprising:
   sending, by the cache control unit, the second data read instruction in the cache to the storage subsystem;
   reading, by the storage subsystem, the data from the storage space corresponding to the destination address;
   writing the data into the cache according to the cache address;
   reading, by the interface card, the data from the cache; and
   sending the data to the host.

3. The method according to claim 1, wherein obtaining, by the interface card, the data and the destination address of the data comprises obtaining, by the interface card, the data and the destination address of the data from the first data write instruction.

4. The method according to claim 1, wherein obtaining, by the interface card, the data and the destination address of the data comprises receiving, by the interface card in a remote direct memory access (RDMA) manner, the data and the destination address of the data.

5. An interface card comprising:
   a receiver configured to receive a first data write instruction and a first data read instruction from a host; and
   a processor coupled to the receiver and configured to:
      obtain data and a destination address of the data, wherein the first data read instruction comprises the destination address, and wherein the destination address is an address at which the data is to be written into a storage subsystem of a storage device;
      write the data and the destination address into a cache of the storage device without consuming any resources of a second processor on the storage device;
      generate a second data write instruction, wherein the second data write instruction comprises a source address and the destination address, wherein the source address is an address at which the data is stored in the cache, and wherein the second data write instruction instructs the storage subsystem to read the data from the cache according to the source address and to write the data into storage space corresponding to the destination address;

send the second data write instruction from a cache controller of the storage device to the storage subsystem without consuming any resources of the second processor;

generate a second data read instruction; and write the second data read instruction into the cache, wherein the second data read instruction comprises the destination address and a cache address at which the data is to be written into the cache from the storage subsystem.

6. The interface card according to claim 5, wherein the cache is in the interface card and is connected to the processor, and wherein the cache controller is in the interface card.

7. The interface card according to claim 5, wherein the cache is in the processor, and wherein the cache controller is in the interface card.

8. The interface card according to claim 5, wherein the cache comprises at least one submission queue, and wherein the processor is further configured to:

write the second data write instruction into the submission queue; and send the second data write instruction to the storage subsystem in a direct memory access (DMA) manner.

9. The interface card according to claim 5, wherein the second data read instruction instructs the storage subsystem to read the data from the storage space corresponding to the destination address and to write the data into the cache according to the cache address, and wherein the processor is further configured to:

send the second data read instruction from the cache controller to the storage subsystem;

read the data from the cache; and send the data to the host.

10. The interface card according to claim 5, wherein the processor is further configured to obtain the data and the destination address of the data from the first data write instruction.

11. The interface card according to claim 5, wherein the interface card comprises a network interface card (MC) configured to implement a remote direct memory access (RDMA) protocol, and wherein the processor is further configured to receive, in an RDMA manner, the data and the destination address of the data from the host.

12. A storage device comprising:

a cache;

an interface card coupled to the cache and configured to:

receive a first data write instruction from a host;

obtain data and a destination address of the data, wherein the destination address indicates an address at which the data is to be written;

write the data and the destination address into the cache without consuming any resources of a processor on the storage device;

generate a second data write instruction, wherein the second data write instruction comprises a source address and the destination address, and wherein the source address is an address at which the data is stored in the cache;

receive a first data read instruction from the host, wherein the first data read instruction comprises the destination address;

generate a second data read instruction; and write the second data read instruction into the cache, wherein the second data read instruction comprises the destination address and a cache address at which the data is to be written into the cache from the storage subsystem;

a cache controller coupled to the interface card and the cache and configured to send the second data write instruction without consuming any resources of the processor; and a storage subsystem coupled to the cache controller and configured to:

receive the second data write instruction from the cache controller;

read the data from the cache according to the source address; and write the data into storage space corresponding to the destination address.

13. The storage device according to claim 12, wherein the interface card comprises a microprocessor connected to the cache and the cache controller, and wherein the cache and the cache controller are in the interface card.

14. The storage device according to claim 12, wherein the interface card comprises a microprocessor, wherein the cache is in the microprocessor, and wherein the cache controller is in the interface card.

15. The storage device according to claim 12, wherein the processor on the storage device is connected to the cache, wherein the cache is outside the interface card, wherein the cache controller is outside the interface card, and wherein the cache controller is connected to the cache.

16. The storage device according to claim 15, wherein the processor is further configured to send the destination address to the host.

17. The storage device according to claim 12, wherein the cache comprises a submission queue, and wherein the interface card is further configured to write the second data write instruction into the submission queue.

18. The storage device according to claim 12, wherein the cache controller is further configured to send the second data read instruction in the cache to the storage subsystem, wherein the storage subsystem is further configured to:

read the data from the storage space corresponding to the destination address; and write the data into the cache according to the cache address, and wherein the interface card is further configured to:

read the data from the cache; and send the data to the host.

19. The storage device according to claim 12, wherein the interface card is further configured to:

read the data from the cache; and send the data to the host.

20. The storage device according to claim 12, wherein the interface card is further configured to receive, in a remote direct memory access (RDMA) manner, the data and the destination address of the data from the host.

* * * * *

UNITED STATES PATENT AND TRADEMARK OFFICE
CERTIFICATE OF CORRECTION

PATENT NO. : 11,144,465 B2  
APPLICATION NO. : 16/598755  
DATED : October 12, 2021  
INVENTOR(S) : He et al.

Page 1 of 1

It is certified that error appears in the above-identified patent and that said Letters Patent is hereby corrected as shown below:

In the Claims

Claim 11, Column 37, Line 42: "network interface card (MC)" should read "network interface card (NIC)"

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*